US012505263B2

(12) United States Patent
Doggett et al.

(10) Patent No.: US 12,505,263 B2
(45) Date of Patent: Dec. 23, 2025

(54) TESSELLATION AND CONNECTION SYSTEM FOR SPACE ASSEMBLY OF MODULAR UNITS

(71) Applicant: UNITED STATES OF AMERICA AS REPRESENTED BY THE ADMINISTRATOR OF NASA, Washington, DC (US)

(72) Inventors: William R. Doggett, Poquoson, VA (US); Brace W. White, Poquoson, VA (US); John T. Dorsey, Yorktown, VA (US); Julia E. Cline, Yorktown, VA (US); David Kang, Mclean, VA (US); Kyongchan Song, Poquoson, VA (US); John E. Teter, Jr., Williamsburg, VA (US); David A. Paddock, Toano, VA (US); Iok M. Wong, Hampton, VA (US); Rounak Mukhopadhyay, Bridgewater, NJ (US); Robert F. Martin, Hampton, VA (US); Patrick A. Cosgrove, Hampton, VA (US); B.Danette Allen, Norfolk, VA (US); Walter J. Waltz, Williamsburg, VA (US); Ralph A. Williams, Hampton, VA (US); Sherif A. Shazly, Hampton, VA (US); John R. Cooper, Yorktown, VA (US); Matthew P. Vaughan, Hampton, VA (US); James V. Plant, Norfolk, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 1122 days.

(21) Appl. No.: 17/487,598

(22) Filed: Sep. 28, 2021

(65) Prior Publication Data

US 2022/0100930 A1    Mar. 31, 2022

Related U.S. Application Data

(60) Provisional application No. 63/084,277, filed on Sep. 28, 2020.

(51) Int. Cl.
*G06F 30/13* (2020.01)
*G06F 111/20* (2020.01)

(52) U.S. Cl.
CPC .......... *G06F 30/13* (2020.01); *G06F 2111/20* (2020.01)

(58) Field of Classification Search
CPC ....... G06F 30/13; G06F 30/23; G06F 2111/20
See application file for complete search history.

(56) References Cited

U.S. PATENT DOCUMENTS

| 4,819,399 A | * | 4/1989 | Onoda | H01Q 1/1235 |
| | | | | 52/645 |
| 4,930,930 A | * | 6/1990 | Coppa | E04B 1/1909 |
| | | | | 52/645 |

(Continued)

OTHER PUBLICATIONS

Collins, T. & Lalvani, H. "Generation and Analysis of Reduced-Part-Count Truss Geometries for Space-Based Applications" 32nd Structures Structural Dynamics & Materials Conf. (1991) (Year: 1991).*

(Continued)

*Primary Examiner* — Jay Hann
(74) *Attorney, Agent, or Firm* — M. Bruce Harper; Trenton J. Roche; Robin W. Edwards

(57) ABSTRACT

Systems and methods for mapping a planar surface to a curved surface. One such method comprises providing a planar lattice pattern having identical regular polygon shapes which can be truss support modules for supporting a curved surface structure. Method further include determin- (Continued)

ing respective positions of the nodal points of the identical polygon shapes by placing a starting nodal point on an axis of symmetry of the planar lattice pattern and iteratively positioning each nodal point in relation to already placed neighboring nodes to make a distance between a currently positioned nodal point optimally close with a set value of the planar lattice pattern. Method still further comprises forming a curved lattice pattern of the truss support module based on the positions of the nodal points of the identical polygon shapes.

18 Claims, 24 Drawing Sheets

(56) References Cited

U.S. PATENT DOCUMENTS 7,578,109 B2 * 8/2009 Reynolds ................ E04H 12/00
52/638

2010/0162637 A1 * 7/2010 Brell-Cokcan ......... E04B 7/105
52/80.1

OTHER PUBLICATIONS

Wang, Q., et al. "A triangular mesh generator over free-form surfaces for architectural design" Automation in Construction, vol. 93, pp. 280-292 (2018) (Year: 2018).*

Lan, T. "Space Frame Structures" Structural Engineering Handbook (1999) (Year: 1999).*

Jenett, B., et al. "Design of Multifunctional Hierarchical Space Structures" IEEE Aerospace Conf. (2017) available from <https://ieeexplore.ieee.org/abstract/document/7943913> (Year: 2017).*

William R. Doggett et al. "Modular Assembly: An Efficient Approach for Creation and Maintenance of Persistent Space Assets". 2019 IEEE International Conference on Robotics and Automation. 20 pages.

* cited by examiner

Provide an Initial Planar Lattice Pattern Having Identical Regular Polygon Shapes Representing Truss Support Modules for Supporting a Curved Surface Structure
210

Determine Respective Positions of the Nodal Points of the Identical Polygon Shapes on a Top Surface of the Curved Surface Structure by Selecting a Starting Nodal Point on an Axis of Symmetry of the Initial Planar Lattice Pattern and Iteratively Positioning Each Nodal Point in Optimal Proximity to Already Placed Neighboring Nodes in Relation with a Set Distance Value of the Initial Planar Lattice Pattern
220

Form a Curved Lattice Pattern of the Truss Support Structure comprising Identical Regular Polygon Shapes Such That:
230

Nodal Positions of a Top Surface of the Truss Support Modules Are Calculated Based on the Positions of the Nodal Points of the Identical Polygon Shapes of the Curved Surface Structure and an Offset Distance between the Top Surface of the Curved Surface Structure and a Top Surface of the Truss Support Structure Wherein a Respective Gap is Positioned between Connecting Corners of the Truss Support Structure Modules; and
232

Positioning of a Bottom Surface of the Truss Support Modules is Calculated Based on the Nodal Positions of the Top Surface of the Truss Support Structure and a Distance between the Top Surface and the Bottom Surface of the Truss Support Modules
234

FIG. 2

Mode 1 / 5.63 Hz Taco Shape

Mode 2 / 9.23 Hz Bowl Shape

Mode 3 / 10.11 Hz Taco and Bowl Shape

Mode 1 / 5.40 Hz Taco Shape

Mode 2 / 8.94 Hz Bowl Shape

Mode 3 / 9.61 Hz Taco and Bowl Shape

Connecting Corner of
TriTruss Support Module
(510)

○ Chosen capture post location
---- Angle bisectors
—— Offset gripper travel path Providing a Planar Lattice Pattern for a Truss Support Structure, Wherein the Truss Support Structure Provides Identical Truss Support Modules and the Planar Lattice Pattern is Composed of Identical Regular Polygon Shapes with a Distance between Connecting Nodes of a Respective Polygon Shape being a Uniform Set Distance Value
2310

Map the Planar Lattice Pattern onto a Doubly Curved Surface by Optimizing Positioning of Connecting Nodes of Each Polygon Shape on the Doubly Curved Surface to the Uniform Set Distance Value, Wherein Each Newly Positioned Node is Optimally Placed in Relation to its Already Placed Neighboring Nodes with Respect to the Uniform Set Distance Value
2320

After All Nodes of the Planar Lattice Pattern Have Been Placed on the Doubly Curved Surface, Adjust Each Node One-by-One Based on Optimizing Its Positioning Relative to Its Neighboring Nodes with Respect to the Set Distance Value
2330

Determine a Curved Lattice Pattern for the Truss Support Structure by Factoring in an Offset Distance that Exists between a Segment of the Curved Surface Support Structure when Supported by the Truss Support Module, in which the Curved Lattice Pattern Is Composed of Identical Regular Polygon Shapes and Provides Nonuniform Gaps between Connecting Polygon Shapes
2340

Assemble the Truss Support Structure to Support the Doubly Curved Surface Structure Based on the Curved Lattice Pattern with Connectors Joining Connecting Truss Support Modules that Are Sized to Fill Respective Nonuniform Gaps of the Curved Lattice Pattern
2350

FIG. 23

TESSELLATION AND CONNECTION SYSTEM FOR SPACE ASSEMBLY OF MODULAR UNITS

CROSS-REFERENCE TO RELATED PATENT APPLICATION(S)

This patent application claims the benefit of and priority to U.S. Provisional Patent Application No. 63/084,277, filed on Sep. 28, 2020, the contents of which are hereby incorporated by reference in their entirety for any and all non-limiting purposes.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND

Most current space systems are launched as a single system. A major drawback to this approach is the finite payload volume and mass constraints imposed by current launch vehicles. An alternative is to assemble space systems on orbit, aggregating components from multiple launches. However, known systems often separate into many unique components, complicating manufacturing, assembly, launch integration, etc. Additional complications are introduced for non-planar (e.g., curved) systems such as telescopes, radars, domes, hangers, etc., since they generally cannot be constructed from a single shape. One or more of these and/or other deficiencies are addressed by various embodiments disclosed herein.

BRIEF SUMMARY

The present disclosure relates to systems and methods that may be implemented to subdivide a planar surface based on a standard shape and mapping the planar surface to a curved surface.

In one aspect, this disclosure teaches a method comprising providing an initial planar lattice pattern having identical regular polygon shapes representing truss support modules for supporting a curved surface structure, wherein the truss support module can be deployed or crated by a lattice structure having nodal points between strut members of the lattice structure and a length of each side of the polygon shape is an identical set value. The method further includes determining respective positions of the nodal points of the identical polygon shapes on a top surface of the curved surface structure by placing a starting nodal point on an axis of symmetry of the initial planar lattice pattern and iteratively positioning each nodal point in relation to already placed neighboring nodes to make a distance between a currently positioned nodal point optimally close with the identical set value of the initial planar lattice pattern. The method further comprises forming a curved lattice pattern of the truss support module that is composed of identical regular polygon shapes based on the positions of the nodal points of the identical polygon shapes.

For another embodiment of the invention, the curved lattice pattern of the truss support module is formed by calculating nodal positions of a top surface of the truss support modules based on the positions of the nodal points of the identical polygon shapes of the curved surface structure and an offset distance between the top surface of the curved surface structure and a top surface of the truss support structure comprising the truss support structure modules, wherein a respective gap is positioned between connecting corners of the truss support structure modules; and calculating positioning of a bottom surface of the truss support modules based on the nodal positions of the top surface of the truss support structure and a distance between the top surface and the bottom surface of the truss support modules.

For another embodiment of the invention, the bottom surface of the truss support module is identical in size and shape to the top surface of the truss support module and is parallel to the top surface of the truss support module.

For another embodiment of the invention, the bottom surface of the truss support module is larger in size and identical in shape to the top surface of the truss support module and is parallel to the top surface of the truss support module.

For another embodiment of the invention, the method further includes calculating positioning of a middle surface layer of the truss support module based on the positioning of the top surface and the bottom surface of the truss support modules.

For another embodiment of the invention, the identical regular polygon shapes comprise equilateral triangles.

For another embodiment of the invention, the method includes assembling the truss support structure to support the curved surface structure using cylindrical connectors corresponding to respective gaps positioned between connecting corners of the truss support structure modules.

For another embodiment, different sized cylindrical connectors are utilized to assemble the truss support structure.

For another embodiment, the curved surface structure is a doubly curved surface structure, and the method includes assembling the truss support structure to support the doubly curved surface using multi-cylindrical connectors corresponding to respective gap sizes positioned between the connecting corners of the truss support structure modules.

For another embodiment, different sized multi-cylindrical connectors are utilized to assemble the truss support structure.

For another embodiment, the curved surface structure is a doubly curved surface structure; and/or respective gaps positioned between connecting corners of the truss support structure modules are non-uniform in size.

For another embodiment, the identical regular polygon shapes comprise equilateral triangles, wherein the top surface of the truss support modules is representative of a scalene triangle shape due to the offset distance between the top of the curved surface structure and the top surface of the truss support structure; and overlaying a new equilateral triangle shape on the scalene triangle shapes of the first lattice pattern and optimally orienting the new equilateral triangle shape to the scalene triangle shape on the first lattice pattern to form a final lattice pattern of the truss support modules that is composed of identical new equilateral triangles having gaps between connecting nodes of the new equilateral triangles.

For another embodiment, calculation of the nodal positions of the top surface of the truss support modules comprises forming a first lattice pattern of the truss support modules using the scalene triangle shape to represent the top surface of a respective truss support module; finding a centroid of the scalene triangle shape and selecting a shortest median segment value of the scalene triangle shape; and defining a new equilateral triangle shape having an equal median segment value that matches the shortest median value of the scalene triangle shape.

Yet another embodiment of the invention is a method comprising providing a planar lattice pattern for a truss support structure, wherein the truss support structure comprises identical truss support modules and the planar lattice pattern is composed of identical regular polygon shapes with a distance between connecting nodes of a respective polygon shape being a uniform set distance value. The method further includes mapping the planar lattice pattern on a doubly curved surface by optimizing positioning of connecting nodes of each polygon shape of the planar lattice support structure to the uniform set distance value, wherein the doubly curved surface represents a curved surface structure to be supported by the truss support structure, wherein each newly positioned node is optimally placed in relation to its already placed neighboring nodes with respect to the uniform set distance value. After all nodes of the planar lattice pattern have been placed on the doubly curved surface, the method further comprises iteratively adjusting each node one-by-one based on optimizing its positioning relative to its neighboring nodes with respect to the set value; and determining a curved lattice pattern for the truss support structure to support the doubly curved surface by factoring in an offset distance that exists between a segment of the curved surface support structure when supported by the truss support module, wherein the curved lattice pattern is composed of identical uniform regular polygon shapes and provides nonuniform gaps between connecting polygon shapes, wherein a respective regular polygon shape represents a top surface of the truss support module.

For another embodiment, the method includes assembling the truss support structure to support the doubly curved surface structure based on the curved lattice pattern with connectors joining connecting truss support modules that are sized to fill respective nonuniform gaps of the curved lattice pattern.

Yet another embodiment of the invention is a system comprising a computing device having a processor and a memory; and machine-readable instructions stored in the memory that, when executed by the processor, cause the computing device to perform operations comprising receiving an initial planar lattice pattern having identical regular polygon shapes representing truss support modules for supporting a curved surface structure, wherein the truss support module provides a lattice structure having nodal points between strut members of the lattice structure and a length of each side of the polygon shape is an identical set value. The operations further include determining respective positions of the nodal points of the identical polygon shapes on a top surface of the curved surface structure by placing a starting nodal point on an axis of symmetry of the initial planar lattice pattern and iteratively positioning each nodal point in relation to already placed neighboring nodes to make a distance between a currently positioned nodal point optimally close with the identical set value of the initial planar lattice pattern. Additionally, the operations include forming a curved lattice pattern of the truss support module that is composed of identical regular polygon shapes by: calculating nodal positions of a top surface of the truss support modules based on the positions of the nodal points of the identical polygon shapes of the curved surface structure and an offset distance between the top surface of the curved surface structure and a top surface of the truss support structure comprising the truss support structure modules, wherein a respective gap is positioned between connecting corners of the truss support structure modules; and calculating positioning of a bottom surface of the truss support modules based on the nodal positions of the top surface of the truss support structure and a distance between the top surface and the bottom surface of the truss support modules.

For another embodiment, the identical regular polygon shapes comprise equilateral triangles; the bottom surface of the truss support module is identical in size and shape to the top surface of the truss support module and is parallel to the top surface of the truss support module; the bottom surface of the truss support module is larger or smaller in size to the top surface of the truss support module and is parallel to the top surface of the truss support module; and/or respective gaps positioned between connecting corners of the truss support structure modules are non-uniform in size.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIG. 2 provides a flowchart of an exemplary tessellation method via node-by-node optimization for forming a curved lattice pattern of a truss support structure or system that comprises identical regular polygon shapes in accordance with embodiments of the present disclosure.

FIG. 23 provides a flowchart for an exemplary method of arranging and assembling a truss support structure for supporting a curved surface structure in accordance with embodiments of the present disclosure.

DETAILED DESCRIPTION OF THE INVENTION

Figure 1:
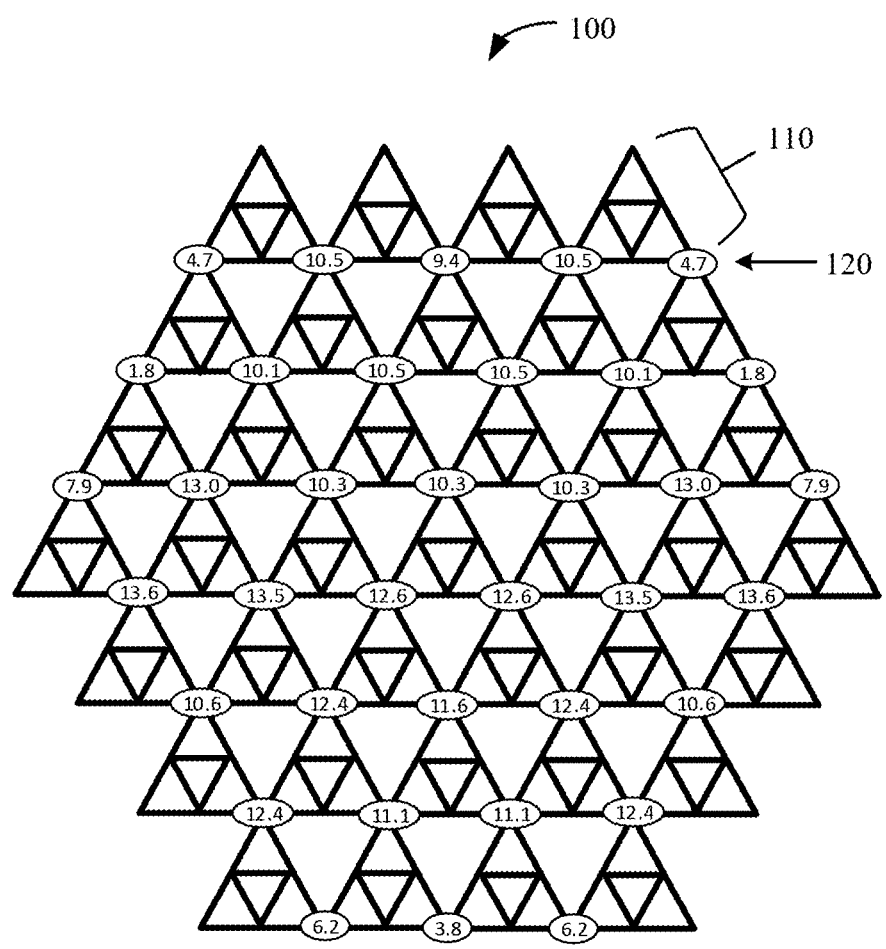
FIG. 1 shows a placement or layout of top surfaces of truss support components or modules with gaps remaining between the corners of connecting truss support modules in accordance with embodiments of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows an example placement or layout 100 of top surfaces of truss support components or modules 110 with gaps 120 remaining between the corners of connecting truss support modules 110, where the top surface in this non-limiting example is defined by an equilateral triangle. An exemplary process for overlaying the identical equilateral shapes (e.g., triangles) is disclosed in the present disclosure. By design, gaps 120 remain between the corners of connecting modules 110, as represented by the ellipse shapes having different gap size values. The size of the gaps 120 directly affects the structural performance of a truss support structure or system (composed of the truss support modules 110) because the load paths no longer meet at the center of the nodes. The larger the gaps 120, the farther the load paths deviate from the center of the nodes, so a gap size minimization procedure can also be implemented in accordance with embodiments of the present disclosure.

The methodology and technology described in the present disclosure is a general approach, general in terms of global surface shape and geometric size, to subdivide the surface based on a standard shape. An exemplary truss support module 110 is based on an equilateral triangle, which provides for the ability to form isogrids, a high performance structural form. However, the methodology applies to a variety of structural forms including square modules, pentagon modules, erectable structures, etc.

Correspondingly, FIG. 2 provides a flowchart of an exemplary tessellation method via node-by-node optimization for forming a curved lattice pattern in the surface generated by a truss support structure or system that comprises identical regular polygon shapes in accordance with one embodiment. An initial planar lattice pattern having identical regular polygon shapes representing truss support modules (e.g., modules 110) for supporting a curved surface structure, such as a curved mirror reflector, may be provided (e.g., block 210). The truss support module 110 can be deployed or crated by an erectable lattice structure having nodal points connecting strut members of the erectable lattice structure, wherein a length of each side of the polygon shape is an identical set value. Correspondingly, respective positions of the nodal points of the identical polygon shapes on a top surface of the curved surface structure may be determined (e.g., see block 220), which may be performed by selecting and placing a starting nodal point on an axis of symmetry of the initial planar lattice pattern and iteratively positioning each nodal point in relation to already placed neighboring nodes to make a distance between a currently positioned nodal point optimally close with the identical set value of the initial planar lattice pattern. A curved lattice pattern of the truss support structure or system comprising identical regular polygon shapes may be formed (e.g., see block 230). To do so, nodal positions of a top surface of the truss support modules 110 may be calculated (e.g., block 232) based on the positions of the nodal points of the identical polygon shapes of the curved surface structure and an offset distance between the top surface of the curved surface structure and a top surface of the truss support structure comprising the truss support structure modules 110, wherein a respective gap 120 is positioned between connecting corners of the truss support structure modules 110. Positioning of a bottom surface of the truss support modules 110 may be calculated (such as, for example, block 234) based on the nodal positions of the top surface of the truss support structure and a distance (e.g., height) between the top surface and the bottom surface of the truss support modules 110.

Figure 3:
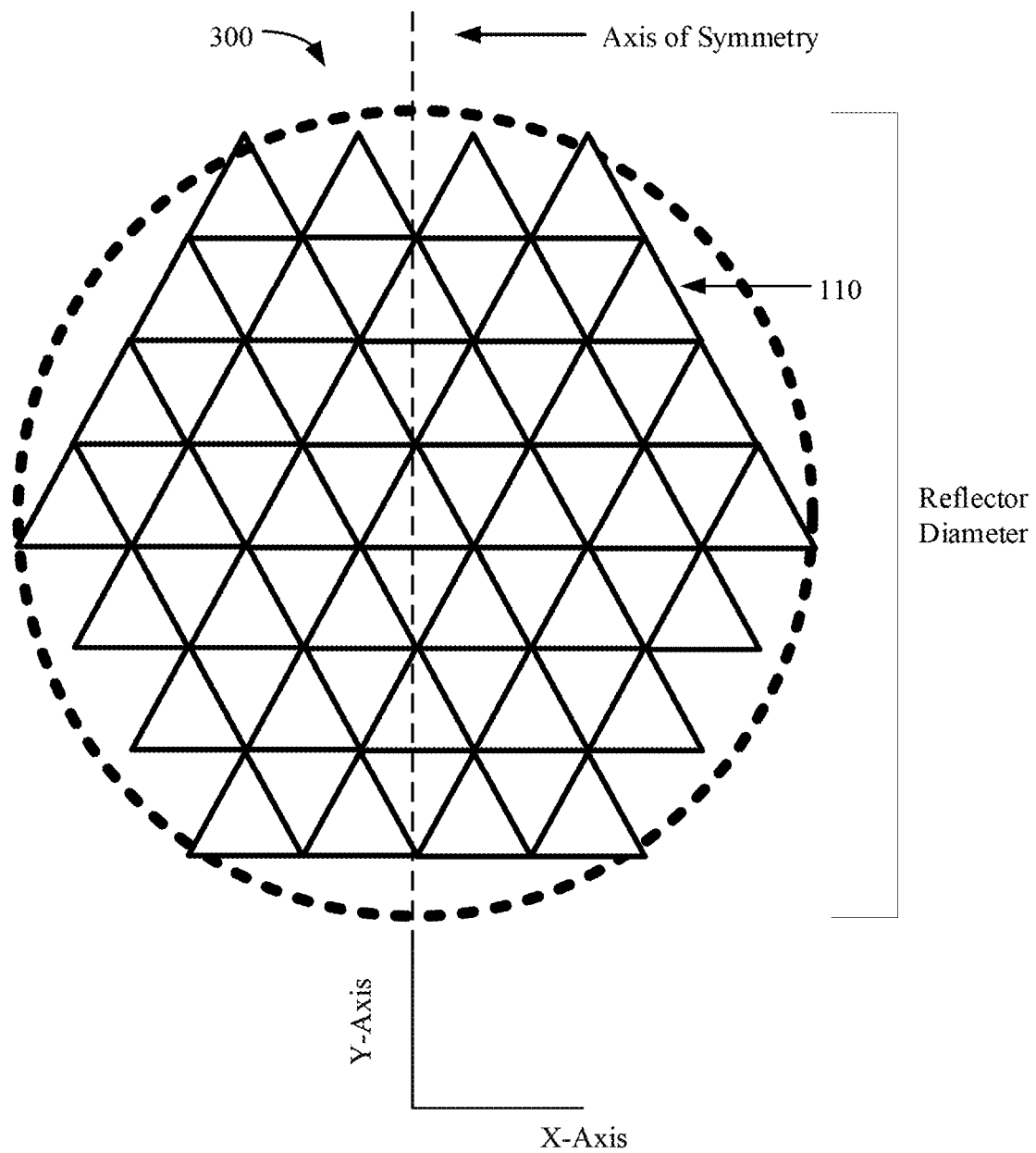
FIG. 3 illustrates that a top surface of a truss support structure can be considered independently as a triangular lattice inscribed within the space of a diameter of a curved surface structure in accordance with embodiments of the present disclosure.
Figure 4:
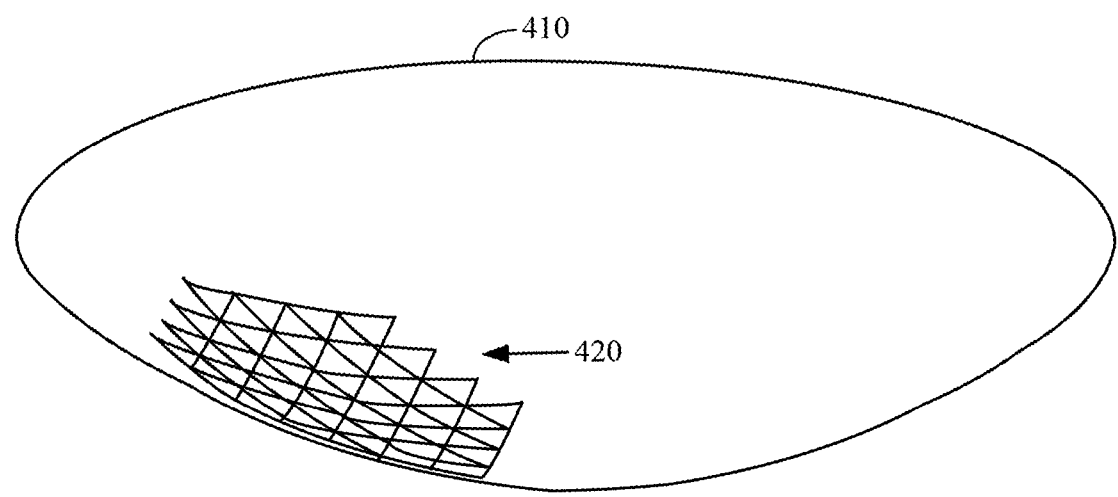
FIG. 4 illustrates the tessellation of a planar lattice pattern onto a doubly curved surface in accordance with the present disclosure.

Using the teachings from FIG. 2 and/or other embodiments herein enables large telescopes to be assembled from individual cost effective modules. For example, a reflector mirror surface can be held in place by a truss support structure 300, which is composed of struts and nodes that connect the struts. In a non-limiting example, the top surface of the truss support structure can be considered independently as a triangular lattice (e.g., a TriTruss support module) inscribed within the space of the diameter of the reflector, as shown in the example of FIG. 3. For a reflector, such as reflector 410 shown in FIG. 4, this surface is usually a portion of a paraboloid, which prevents the triangles within the lattice 420 from all being identical, as shown in FIG. 4. This results in many uniquely sized strut lengths or module sizes which increases the costs and complexity of manufacturing and assembly. Aspects of the present disclosure relate method for tessellating an initially flat or planar lattice pattern 420 on a curved surface, such as a curved reflector 410, using all identically sized polygons (e.g., equilateral triangles) and therefore all identical surface strut lengths via node-by-node optimization. By carefully grouping struts, uniform modules with non-uniform gaps (and corresponding non-uniform connectors) can be used to tessellate the surface. The approaches of the present disclosure are applicable to metallic or composite connections and are scalable for different global curved shapes (parabola, cylinder, sphere, etc.) and in the number of rings and geometric size.

Figure 5A:
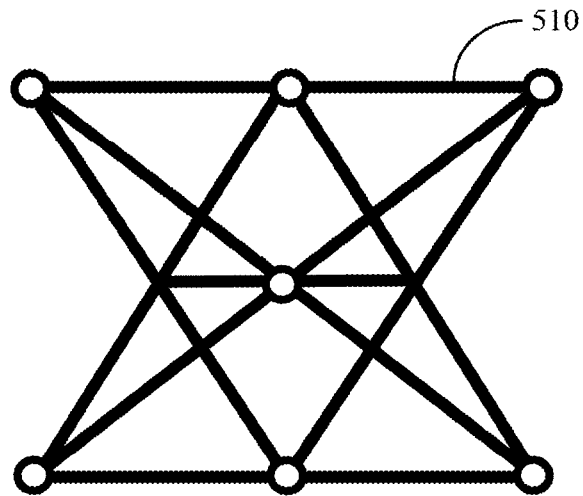
FIGS. 5A-5B show a side view and perspective view respectively of a TriTruss support module in accordance with the present disclosure.
Figure 5B:
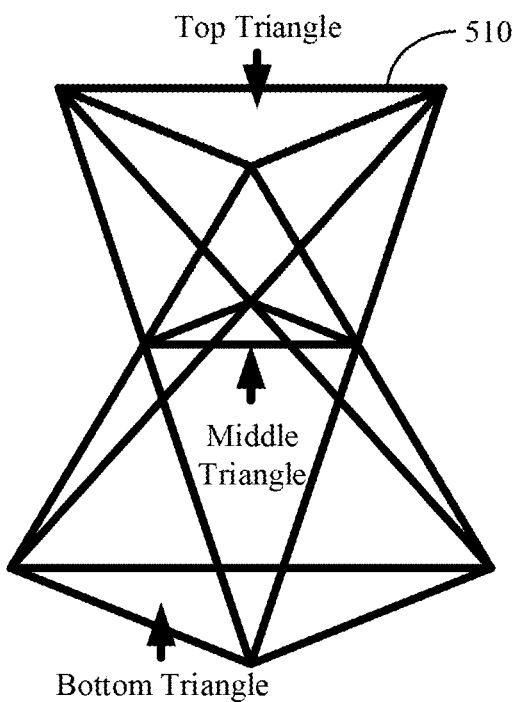

It is noted that an attempt to tessellating a curved surface with all identical shapes can only be achieved by leaving gaps 120 between shapes. If the shapes are equilateral triangles (all sides the same length) then these gaps 120 occur at the triangle corners. In a non-limiting embodiment, an equilateral triangle was selected because it can be used to accurately represent the TriTruss support module 510, as shown in FIGS. 5A-5B, which can be used to form a curved reflector's support truss. In contrast to tessellation of a curved structure which cannot occur with a uniform shape, tessellation of a planar structure can occur with a uniform shape, such as the equilateral triangle, a regular hexagon, regular pentagon, a square, regular trapezoid, octahedron, etc.

In accordance with embodiments of the present disclosure, an exemplary non-limiting method for tessellating an initially flat triangular lattice 420 (as represented by FIG. 4) onto a curved reflector surface 410 via node-by-node optimization is presented. For this non-limiting example, a mirror surface lattice and TriTruss support modules for the 2019 in-space assembled telescope (iSAT) reflector are selected to be used as exemplary design constraints. However, it is noted that the techniques of the present disclosure can apply to any module shape, such as square as opposed to triangular and regular or non-regular shapes.

Figure 6A:
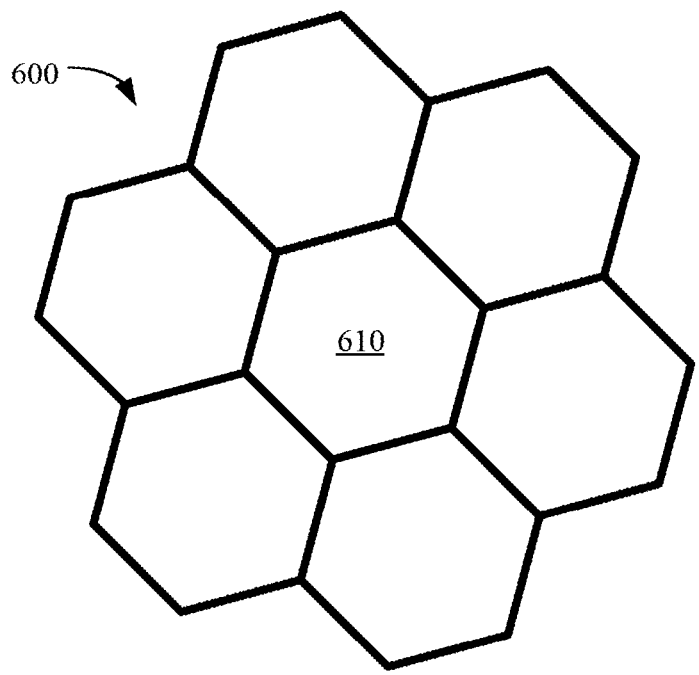
FIG. 6A shows a mirror raft containing 7 hexagonal mirror segments in accordance with the present disclosure.
Figure 6B:
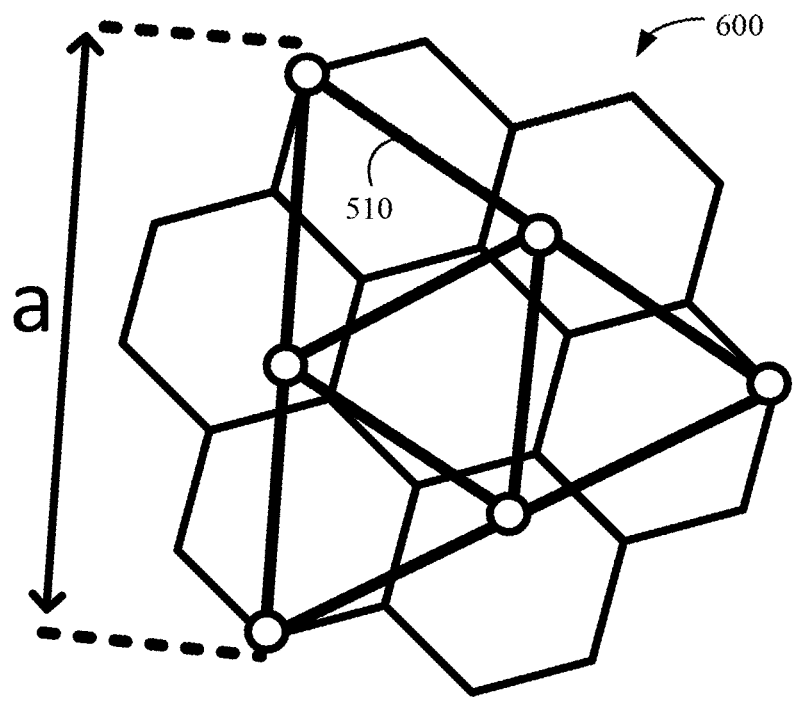
FIG. 6B-6C show a bottom view and a side view respectively of the TriTruss support module being used as a support mechanism for the mirror raft of FIG. 6A in accordance with the present disclosure.
Figure 6C:
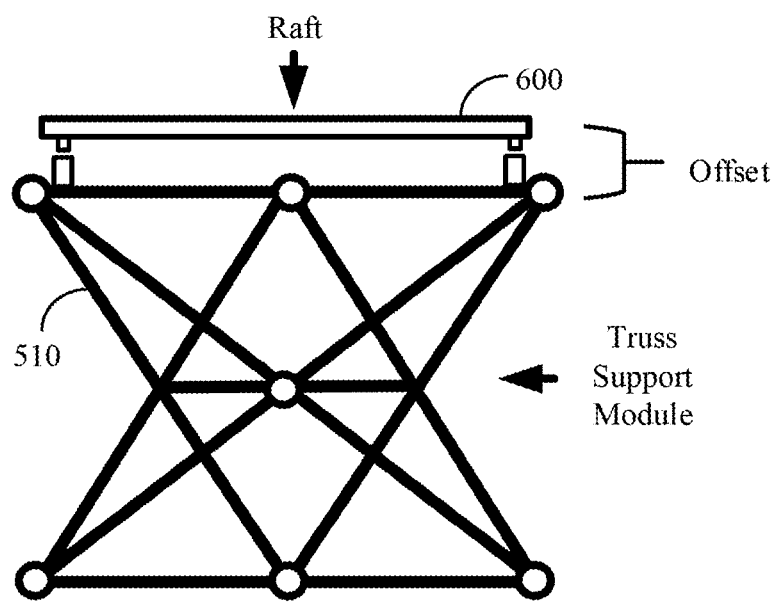
Figure 7:
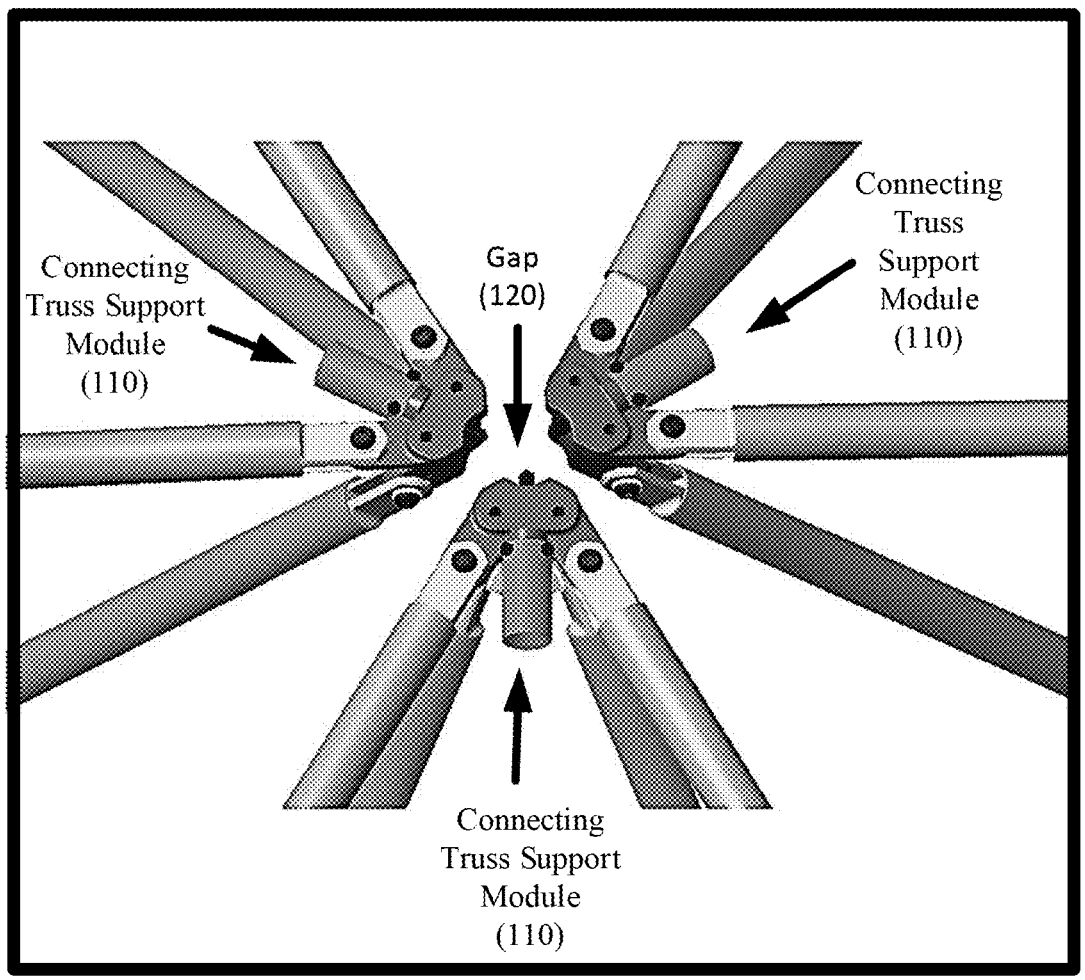
FIG. 7 illustrates a gap existing being connecting truss support modules in accordance with embodiments of the present disclosure.

The iSAT relies on a large diameter, offset parabolic reflector as the primary mirror, and the 20-meter diameter reflector in the iSAT study is comprised of 37 mirror rafts. As shown in FIG. 6, each raft 600 contains 7 hexagonal mirror segments 610. The raft 600 is a structural element that supports the curved surface segments of the mirror. Each mirror raft 600 is attached to and supported by a truss support module, such as module 110, which is a TriTruss support module 510 for this non-limiting example. Correspondingly, FIGS. 6B and 6C show a bottom view and a side view respectively of a TriTruss support module 510 being used as a support mechanism for a mirror raft 600, with FIG. 6B denoting a surface member/strut length (a) of the TriTruss support module. One example novel tessellation method via node-by-node optimization disclosed herein precisely sizes and positions the individual components of the iSAT reflector support truss to form a doubly curved reflector support truss while allowing all TriTruss support modules 510 to be identical. The doubly curved structure comprised of uniform modules is ultimately achieved by intentionally leaving gaps 120 at the nodes between connecting truss support modules 110, as illustrated by FIG. 7.

The primary mirror surface of the iSAT reflector is designed to be on an offset paraboloid. The telescope will be positioned with the z-axis of the paraboloid pointing directly at the light source, so the incoming light will be reflected by the primary mirror to the focus. The purpose of the primary mirror being offset is to allow the secondary mirror, its support structure, and collector to be positioned near the focus without blocking any of the incoming light to the primary mirror. For the iSAT, the focal length is 40 meters, and the edge of the primary mirror is offset from the paraboloid vertex by 3.64 meters. Precise truss assembly is crucial to ensure that the mirror surface maintains the correct curvature to capture focused images.

Although the surfaces of the mirror segments 610 are uniquely curved to match the paraboloid, the TriTruss support modules 510 and mirror rafts 600 are planar structures. To achieve the doubly curved reflector assembly, each module must be positioned so its nodal points are parallel to the parabolic surface. The top surface of the support truss can be considered independently as a triangular lattice inscribed within the space of a 20-meter diameter circle (see, for example, FIG. 3). The vertices of the top triangle of each TriTruss support module 510 align with three nodal points on the attached raft 600 (FIG. 6B). Matching nodal points can further be considered on the mirror surface itself. Therefore, the same triangular lattice pattern can be tessellated on the parabolic surface (FIG. 4) with the locations and dimensions of each level of the truss support structure being calculated sequentially downward from those initial points.

Figure 8A:
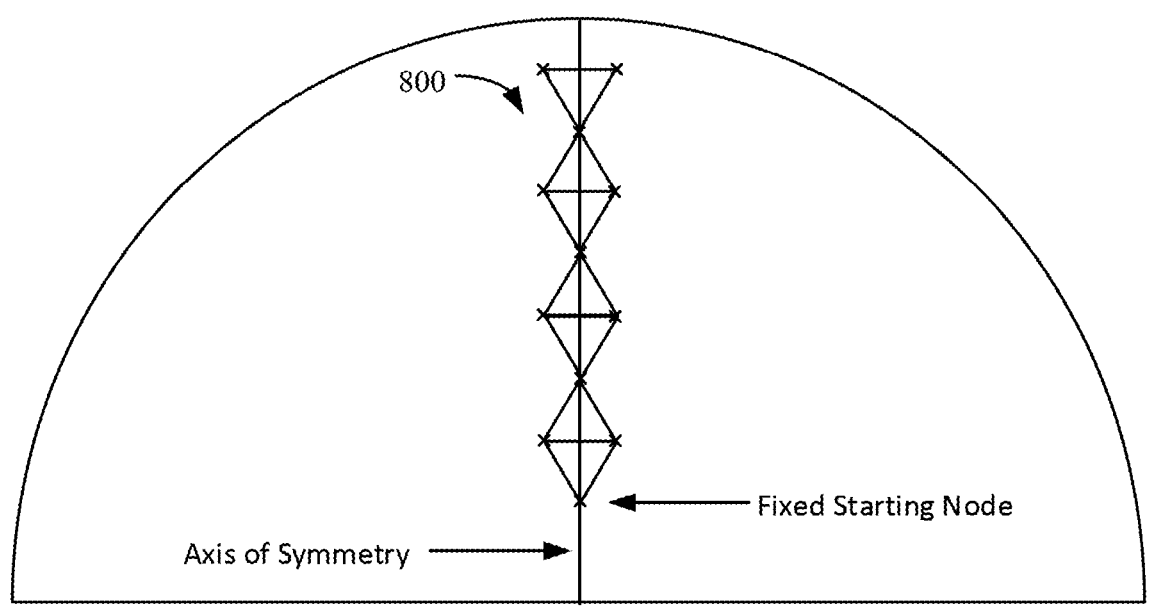
FIGS. 8A-8D shows the placement of nodes of a planar lattice pattern onto a curved surface in accordance with embodiments of the present disclosure.
Figure 8B:
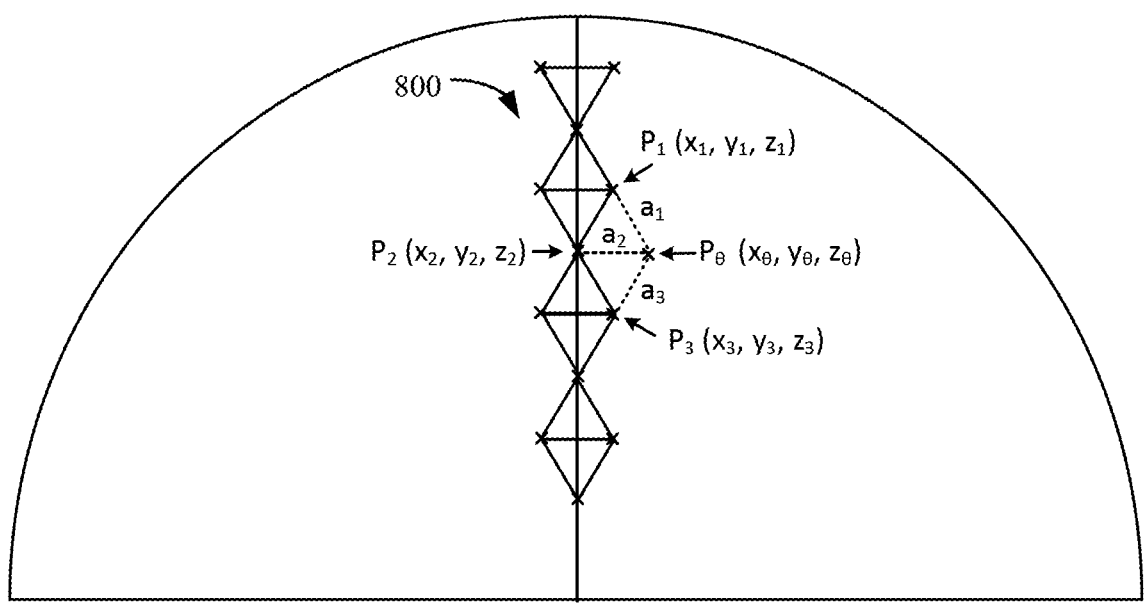

In an effort to optimize the mirror surface nodal placements, the difference $\Delta a$ between the shortest and longest node-to-node distances on the curved mirror surface is minimized as each node is positioned during the creation of the triangular lattice 800 (FIG. 8A), where a is a surface member/strut length or node-to-node distance. During the initial creation of the lattice 800, only certain nodes can be placed at a desired distance apart from one another. These nodes are strategically chosen to be the ones closest to the axis of symmetry of the lattice, starting with the bottom middle node fixed 3.64 meters from the paraboloid vertex, as represented by FIG. 8A. Accordingly, the nodes closest to the axis of symmetry are chosen to be at exactly the desired distance from one another. In this figure, each line is exactly 3.215 meters long between connecting nodes. Since the remaining nodes cannot be placed at exactly the desired separation distance from each other, a Mathematica optimization function is utilized to make the actual separation distances as close to the desired distance as possible, as illustrated in FIG. 8B, in which each remaining node is optimally placed in relation to its already placed neighboring nodes to make the distances between them as close to the desired distance as possible. The three dashed lines represent the distances being optimized to determine the node's location. The optimization function is numerical minimization (NMinimize) with "Differential Evolution" as the specified method. The desired distance is chosen to be $a_d=3.215$ m as follows.

$$\text{Minimize}[\text{Max}[|a_d-a_1|,|a_d-a_2|,|a_d-a_3|]]$$

where actual $a_i$ is the norm of the vector or the Euclidean distance between two neighboring nodes with coordinates $(x_0, y_0, z_0)$ and $(x_1, y_1, z_1)=\|P_i-P_0\|=$ $$\sqrt{(x_i-x_0)^2+(y_i-y_0)^2} \tag{1}$$

Figure 8C:
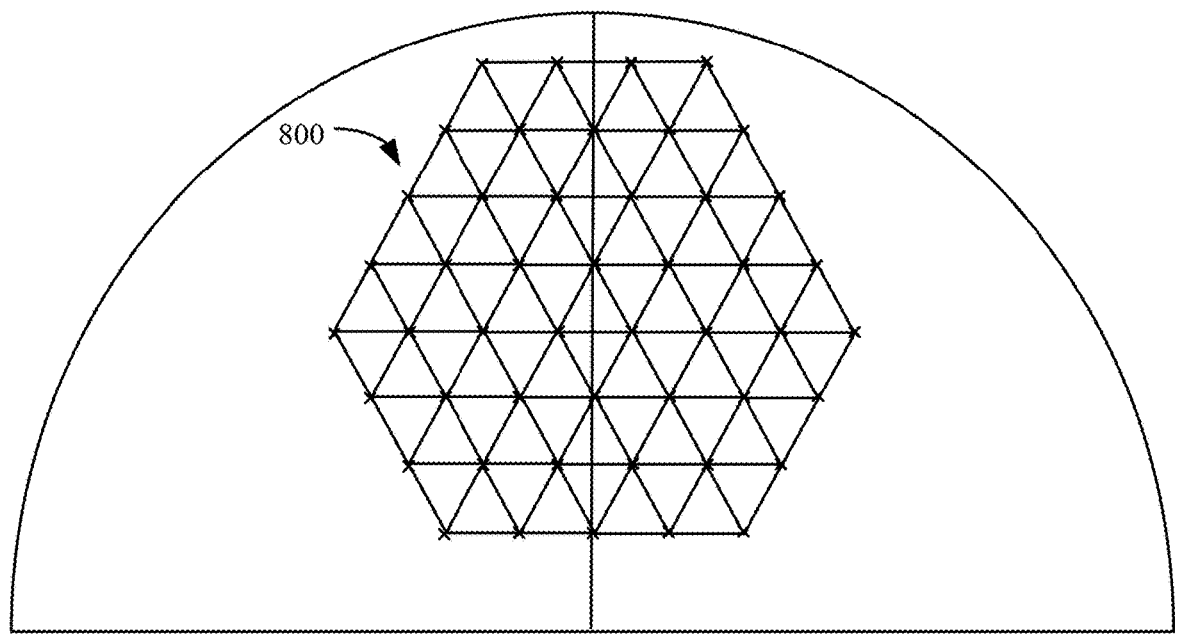
Figure 8D:
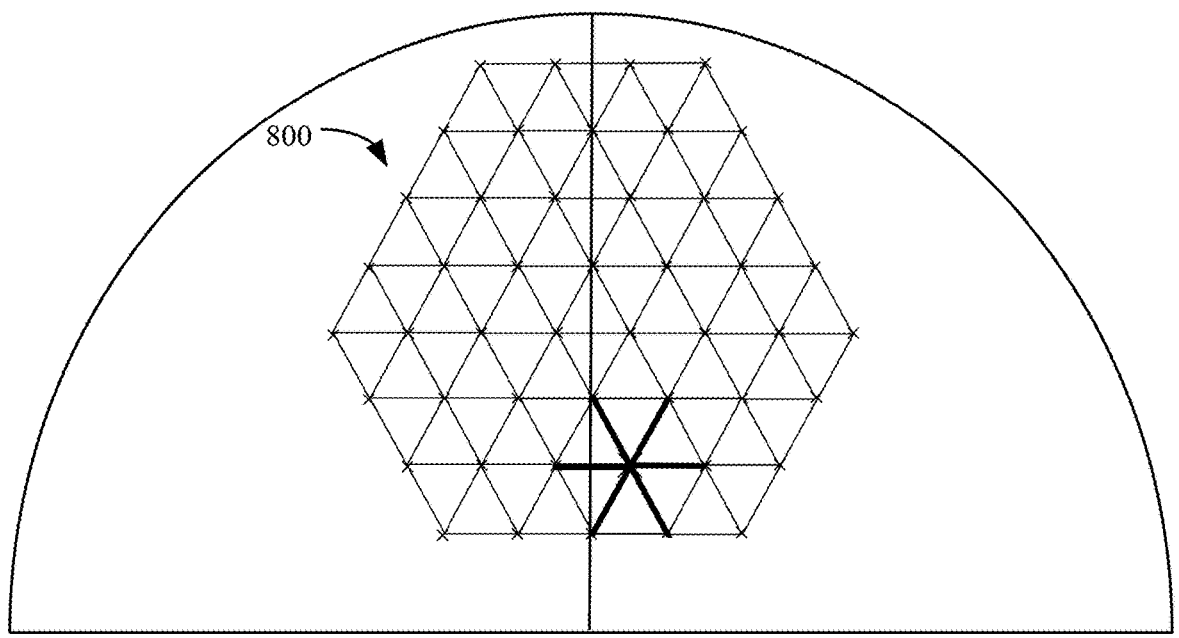
Figure 9:
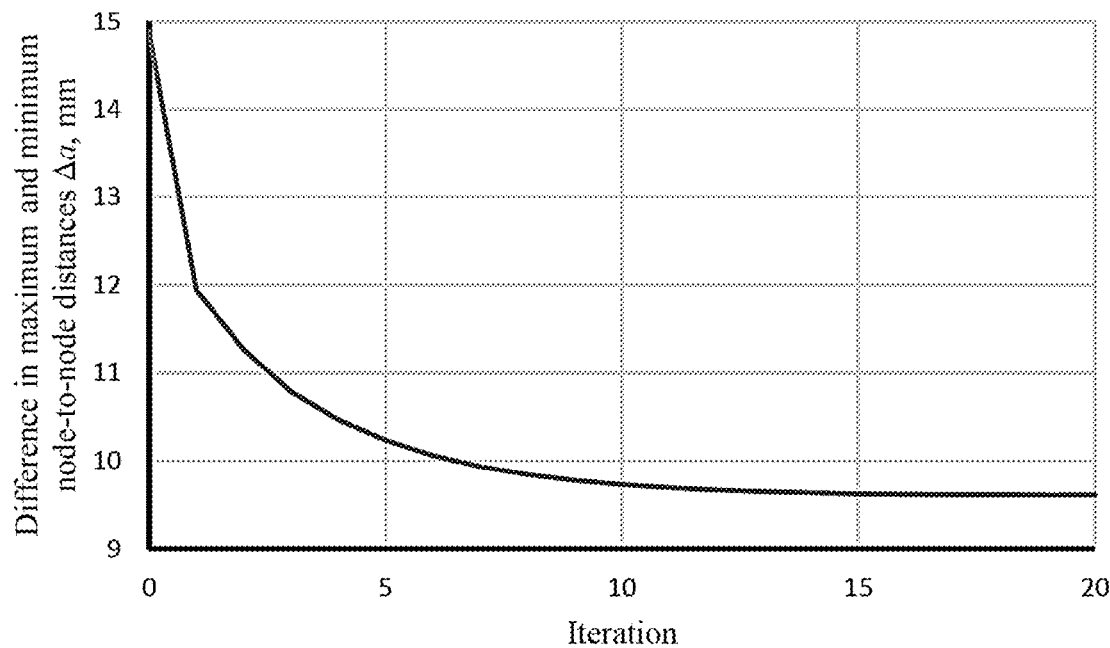
FIGS. 9-10 depict the convergence of optimal nodal placement of the planar lattice pattern onto the curved surface as the number of iterations increases.
Figure 10:
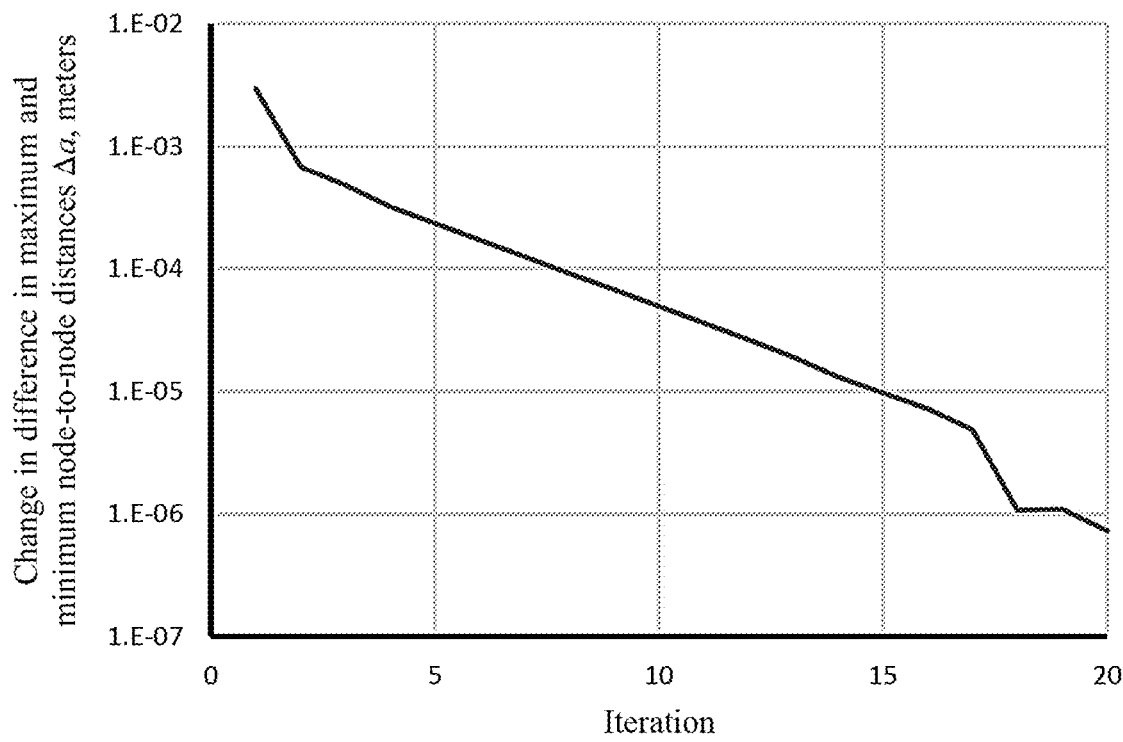

The location of each node may be calculated individually in sequence, outward from the axis of symmetry, ending with the lattice 800 shown in FIG. 8C after having all nodes placed at the end of the first iteration. Here, only the lines near the axis of symmetry are exactly 3.215 m; the rest are slightly shorter or longer than 3.215 m. Thus, after all the nodes are placed, the process is repeated, adjusting each node one-by-one based on the distances to all its neighboring nodes, as illustrated in FIG. 8D. For this example, the only node that remains fixed is the bottom center node; even the other nodes along the axis of symmetry are adjusted. Each node can have a maximum of six neighboring nodes depending on its location in the lattice. Accordingly, the process is iterated, but each node now has more neighboring nodes to optimize itself in relation to. The six bold lines represent the distances being optimized to find the central node's location. In this example, it is shown that each iteration slightly improves Δa, with the improvements decaying exponentially as it converges to the optimal nodal placement, as shown in the plots of FIGS. 9 and 10. In FIG. 9, the difference in maximum and minimum node-to-node distances Δa is plotted at each iteration number, and in FIG. 10, the change in difference in maximum and minimum node-to-node distances is logarithmically plotted at each iteration number. The convergence precision is set at $10^{-6}$ m meaning that the optimization loop ends when the convergence precision of $10^{-6}$ m is reached.

Table 1 below shows the results of the exemplary tessellation method via node-by-node optimization ("Tessellation Via Node-by-Node Optimization") in accordance with embodiments of the present disclosure in comparison to 8 alternative tessellation methods: (1) normal projection, (2) tilted normal projection, (3) optimal tilt normal projection, (4) outside radial projection, (5) inside radial projection, (6) radial projection from twice the focal length to sketch outside paraboloid ("2f outside radial projection"), (7) tilted and radial projection, and (8) normal to paraboloid projection. The main goal in attempting different tessellation methods was to find the method that resulted in the least distortion to the equilateral triangles representing the top surface of the TriTruss support structure.

TABLE 1

| Method | Δa mm | Δa in. |
|---|---|---|
| Normal Projection | 107.2 | 4.222 |
| Tilted Normal Projection | 27.7 | 1.089 |
| Optimal Tilt Normal Projection | 22.8 | 0.897 |
| Outside Radial Projection | 580.8 | 22.865 |
| Inside Radial Projection | 457.9 | 18.028 |
| 2f Outside Radial Projection | 236.5 | 9.313 |
| Tilted Radial Projection | 143.2 | 5.636 |
| Normal to Paraboloid Projection | 44.5 | 1.751 |
| Tessellation Via Node-by-Node Optimization | 9.6 | 0.378 |

Eight different projection methods were investigated to minimize Δa, the difference between the longest and shortest triangle side lengths of the lattice shown in FIG. 3. These projections were all done visually using models in the computer aided design package, Creo Parametric (commercially available from PTC, Boston, MA). The triangle side lengths were measured vertex-to-vertex using the "Measure Distance" tool. An important note here is that the straight-line distance was measured, not the arc length, because the underlying truss modules have flat surfaces. For all methods investigated, the node-to-node length, a, on the flat lattice pattern, prior to projection, was 3.215 meters (FIG. 6B). The paraboloid was created by first generating the datum curve representing the curvature of the iSAT primary reflector, $$Z = 1/160 x^2 \quad (2)$$

and then revolving the curve around the z axis.

For the normal projection method, the triangular lattice was sketched on a plane tangent to the vertex of the paraboloid and located at the correct offset distance from the vertex. Creo's Projection feature projects the sketch normal to the sketch plane onto the desired surface, which for these cases is the paraboloid. Once the lattice was projected onto the paraboloid, the triangle side lengths were measured, and Δa was calculated by subtracting the shortest side length from the longest side length. The normal projection method, like the other tessellation methods, results in increasing differences in the side lengths of the triangles as one proceeds toward the edge of the reflector and distorts the underlying TriTruss array. This distortion affects the size of all mirror segments, rafts, and TriTruss support modules.

For the tilted normal projection method, the sketch plane is tilted to more closely match the curve of the paraboloid prior to projection, which reduces distortion. Three points were selected on the sketch (one in the middle at the bottom and two at the top), and the distances between them were measured. Three matching points separated by the measured distances were placed on the paraboloid, and the sketch plane was generated from those points and projected on the paraboloid.

For the optimal tilt normal projection method, the sketch plane is positioned so that it intersects the paraboloid, with the enclosed volumes above and below the paraboloid being equal, which allows for an optimal projection position to be achieved. Looking at the cross section in 2D, the enclosed areas above and below the parabola are set to be equal. Each area section can be calculated by integrating between the two curves. The sketch plane was then placed at the calculated location, and the sketch was projected normally onto the paraboloid.

For the inside radial projection method, the sketch plane is positioned normal to the vertex of the paraboloid with the sketch being positioned inside the paraboloid with the top two outermost corner points of the sketch intersecting the paraboloid. Lines were generated from the focus of the paraboloid through the nodes of the sketch and onto the paraboloid.

Correspondingly, for the outside radial projection, the sketch plane is positioned tangent to the vertex of the paraboloid with the sketch being positioned outside the paraboloid. Lines were generated from the focus of the paraboloid to the nodes of the sketch. The projected nodes were located at the intersections of the lines and the paraboloid.

For radial projection from twice the focal length to sketch outside paraboloid, the sketch plane is positioned the same as the previous method, but the generated lines begin from twice the focal length=80 meters. As the distance of the starting point of the lines increases to infinity, normal projection is approached.

For tilted radial projection, the sketch plane is positioned in the same location as the projection method for tilted normal projection. Lines were generated from the focus through the nodes of the sketch to project the nodes onto the paraboloid.

For normal to paraboloid projection, the sketch plane is positioned at the optimal position (from the projection method for optimal tilt normal projection), and lines are generated which are normal to the paraboloid and intersect the nodes of the sketch. The nodes are projected to the points of intersection on the paraboloid.

As shown by Table 1, the different projection methods produce a wide range of results. Tilting the sketch plane to match the curvature of the paraboloid more closely prior to projection significantly improved results. It also appears that increasing the distance of the starting point of the projection lines (i.e. bringing the angle of the projection lines to the sketch plane closer to 90 degrees) also improved the results. Therefore, the best projection method was a combination of normal projection and an optimally tilted sketch plane in relation to the paraboloid. However, the tessellation method via node-by-node optimization in accordance with the present disclosure had the best results overall.

Next, details will be given of the general approach to optimally map uniform equilateral triangles (representing the TriTruss support module 510) with minimal gaps 120 between them to a curved surface. As would be appreciated by a person of ordinary skill in the art with the benefit of this disclosure, the method could be generally applied to alternative module shapes, such as squares, among others. The calculated nodal points from the tessellation method via node-by-node optimization define the placement and geometry of the mirror surface. The nodal points of the top surface of the truss module 510 may be offset from the paraboloid by the thickness of the mirror 610, its positioning subassembly, and raft structure 600 (assumed to be 1-meter total in this example). (FIG. 6C shows the offset between the TriTruss support module 510 and raft 600 but does not include the mirror positioning subassembly and is not to scale.) Since the offset surface is parallel to the paraboloid, it is not a parabolic surface itself. The nodal points of this surface form a new lattice with dissimilar scalene (sides of different length) triangles constructed by grouping sets of 3 node-to-node distances. The top surface scalene nodal points are found by translating 1 meter away from the surface along lines normal to the paraboloid at each mirror nodal point. The normal lines are found by first solving for the x and y partial derivatives of the paraboloid equation:

$$z = g(x, y) = \frac{1}{4f}(x^2 + y^2) \tag{3}$$

$$g_x = \frac{x}{2f} \tag{4}$$

$$g_y = \frac{y}{2f} \tag{5}$$

The above equations, along with the (x, y) coordinates of the mirror nodal points are populated in the normal vector equation:

$$N_{Mirror_i} = \begin{Bmatrix} -g_x(x_i, y_i) \\ -g_y(x_i, y_i) \\ 1 \end{Bmatrix} \tag{6}$$

The location of the top surface scalene nodal points for the truss support structure are found using a Cartesian offset from the mirror nodal points in the direction specified by $N_{Mirror_i}$ a specified distance $\Lambda$, here 1 m, representing the offset from the optical surface to the support truss surface. The sign is negative in this case because the translation is in the negative direction.

$$P_{TopScalene_i} = P_{Mirror_i} - \Lambda \frac{N_{Mirror_i}}{\|N_{Mirror_i}\|} \tag{7}$$

A procedure may overlay identical equilateral triangles, defining the top surfaces of the TriTruss support modules 510, onto the scalene triangles. The size and orientation of the equilateral triangles are optimized, i.e. slid around on the offset surface, so all triangle corners are as close to the nodal points as possible without overlapping each other, thus minimizing the gap sizes. Thus, each equilateral triangle is placed on the same plane as its corresponding scalene triangle and has the same centroid. By design, gaps 120 will remain between the corners of connecting modules 110, 510, which ultimately allows the reflector to be composed of identical modules. The size of the gaps 120 directly affects the structural performance of the truss because the load paths no longer meet at the center of the nodes. The larger the gaps, the farther the load paths deviate from the center of the nodes, so a gap size minimization procedure is implemented. In this embodiment, the minimization of $\Delta a$ on the mirror surface was the first major factor, and the sizing and orientation of the equilateral triangles are the other factors.

Figure 11:
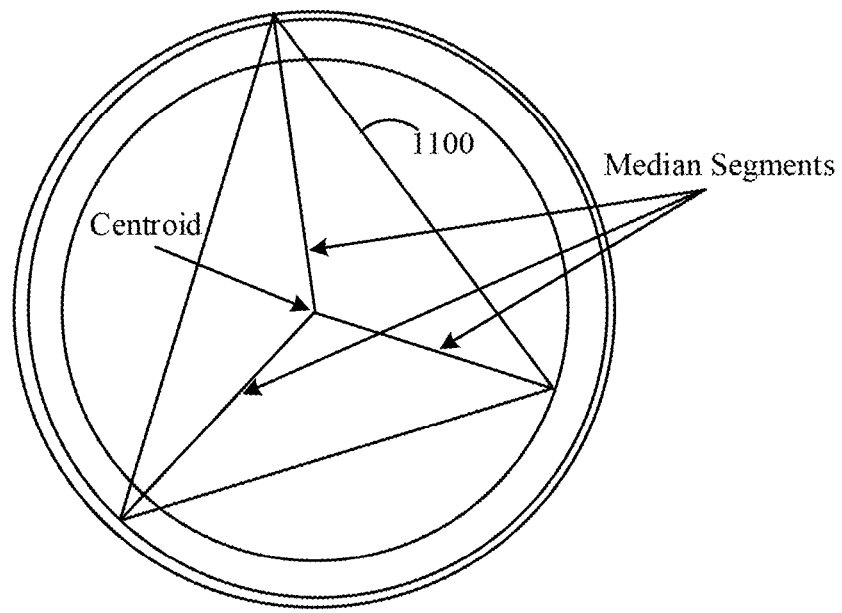
FIGS. 11-14 illustrate a procedure to overlay identical equilateral triangles onto the scalene triangles that represent a top surface of TriTruss support members in accordance with embodiments of the present disclosure.
Figure 12:
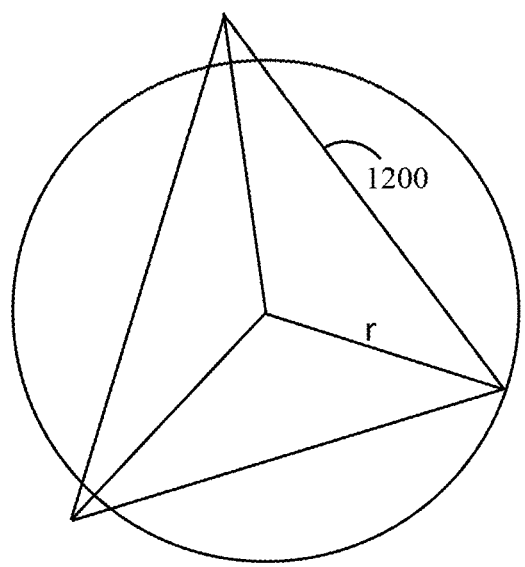
Figure 13:
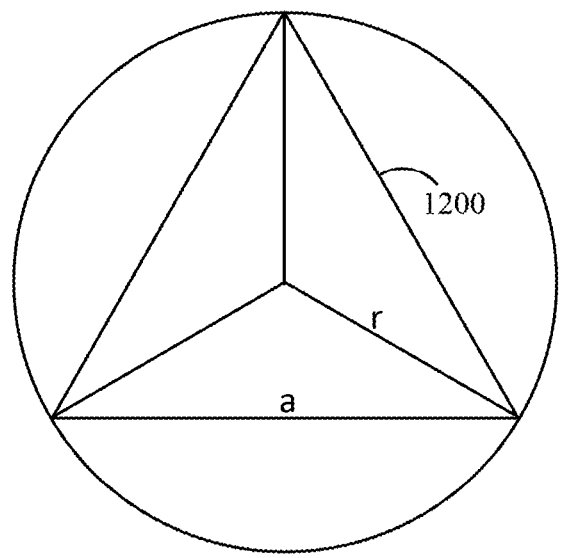

If the nodal points are fixed in space and the scalene triangle 1100 is allowed to spin about its centroid, each vertex would trace a different circle with a radius equal to the length of its median segment from the centroid, as shown in FIG. 11. The medians of a triangle 1100 are line segments that go from each vertex to the midpoint of the opposite side. The intersection of the three medians is the centroid. The radius of the smallest circle is chosen to be the radius of the new corresponding equilateral triangle 1200, as illustrated in FIGS. 12 and 13 to prevent the vertices from extending beyond the nodal points and overlapping the adjacent equilateral triangles. Furthermore, in order for all the equilateral triangles to be identical, the smallest radius of all 37 scalene triangles is chosen for all the equilateral triangles. The length of the sides of the equilateral triangle is calculated by multiplying the chosen radius by $\sqrt{3}$.

$$a_{TopEquilateral} = \sqrt{3} r_{TopEquilateral} \tag{8}$$

The centroid is found by taking the mean of the three vertices of the triangle.

$$C_{Top} = \frac{P_{TopScalene_1} + P_{TopScalene_2} + P_{TopScalene_3}}{3} \tag{9}$$

The triangle's plane is defined by its normal vector which can be found by taking the cross product of two in-plane vectors. Two in-plane vectors are two sides of the triangle, which are found by subtracting the coordinates of one vertex from another.

$$N_{Top} = (P_{TopSclane_1} - P_{TopSclane_2}) \times (P_{TopScalene_3} - P_{TopScalene_2}) \tag{10}$$

Figure 14:
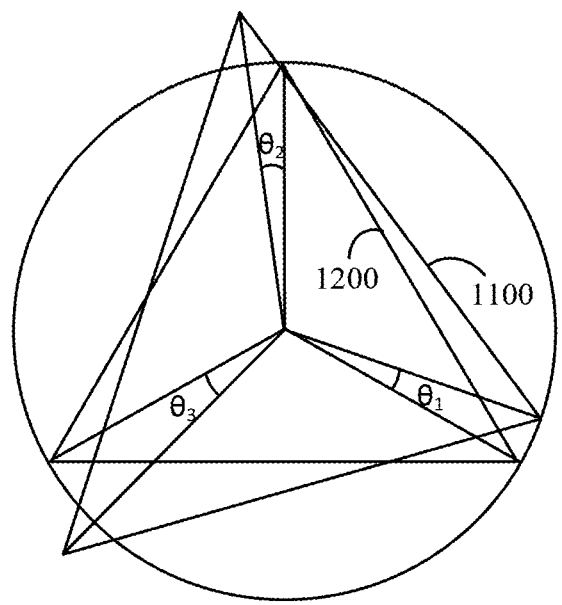

Minimizing the nodal gaps may be achieved via orienting the equilateral triangles 1200 as close to the scalene triangles 1100 as possible. One possible approach to do this is to minimize the maximum distance between the corresponding vertices of the equilateral and scalene triangles. A second possible approach is to minimize the maximum angle between the medians of the equilateral triangle 1200 and the corresponding medians of the scalene triangle 1100, as illustrated in FIG. 14.

$$\text{Minimize}[\text{Max}[\theta_1, \theta_2, \theta_3]] \tag{11}$$

$$\theta_i = \cos^{-1} \frac{M_{Scalene_i} \cdot M_{Equilateral_i}}{\|M_{Scalene_i}\| \|M_{Equilateral_i}\|} \tag{12}$$

The median segment vectors can be found by subtracting the centroid coordinates from the vertex coordinates.

$$M_{Scalene_i} = C_{Top} - P_{TopScalene_i} \tag{13}$$

$$M_{Equilateral_i} = C_{Top} - P_{TopEquilateral_i} \tag{14}$$

The second method resulted in a smaller maximum gap size for the whole structure in this example. The maximum gap size for the top truss surface is 13.6 mm (0.534 in.) and is located on the second outermost ring of the truss. The smallest gap sizes are on the outermost ring. FIG. 1 is a diagram of the gap sizes at each node with gap sizes given in mm, which range from 1.8 mm (0.071 in.) to 13.6 mm (0.534 in.).

Figure 15A:
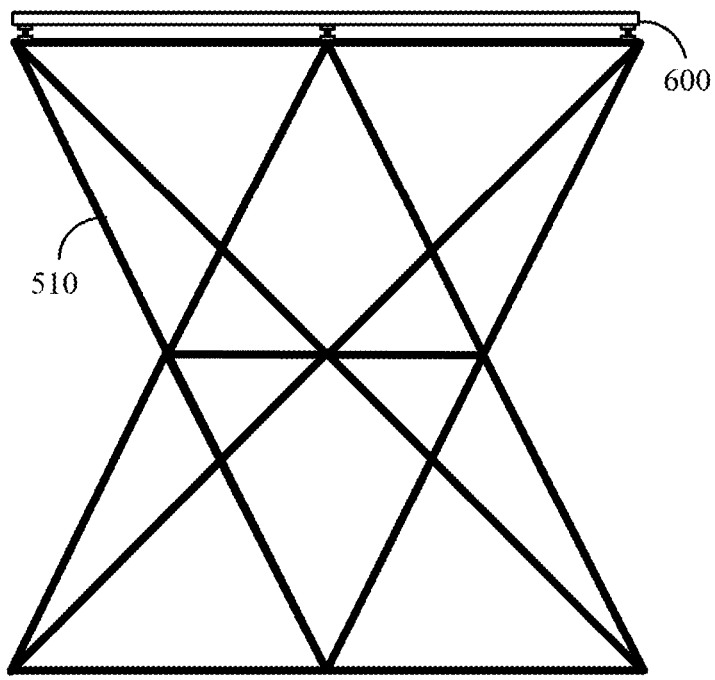
FIGS. 15A-15B show side views of straight-sided and wedge-shaped TriTruss support members respectively in accordance with the present disclosure.
Figure 15B:
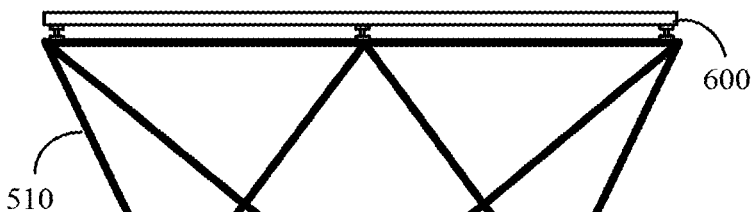

The bottom surface of the truss support module 110 can be calculated by making each bottom triangle parallel to its corresponding top triangle, thereby aligning primary load paths along the top and bottom surfaces. TriTruss support modules 510 can support a variety of shape variations defined by the spacing between the top triangle and bottom triangle and their relative size. FIGS. 15A-15B show the two main variations of a TriTruss support module 510 respectively: a) straight-sided orb) wedge-shaped. For a straight-sided TriTruss (FIG. 15A), the bottom triangle is the same size as the top triangle. This variation causes larger nodal gaps on the bottom surface and thus a larger truss efficiency penalty and likely increased mass. To calculate their locations, each bottom vertex is placed at a distance equal to the TriTruss height along the line normal to the top triangle from each top vertex.

$$P_{BottomStraight_i} = P_{TopEquilateral_i} - H \frac{N_{Top}}{\|N_{Top}\|} \tag{15}$$

For a wedge-shaped TriTruss support module (FIG. 15B), the bottom triangle may be expanded to minimize the size of the nodal gaps on the bottom surface but has the same orientation as the top triangle. However, in alternative embodiments, a bottom surface may be reduced to be smaller in size than the corresponding top surface of a truss support structure. Referring back to the wedge-shaped Tri-Truss of FIG. 15B, the expansion of the bottom triangle follows the same procedure as the top triangle. The initial nodal points are placed along the normal lines from the mirror nodes and at the intersection of the bottom triangle plane.

$$P_{BottomScalene_i} = P_{Mirror_i} - L_i \frac{N_{Mirror_i}}{\|N_{Mirror_i}\|} \tag{16}$$

Similar to the top surface, the bottom nodes create a new lattice of slightly dissimilar scalene triangles. The bottom centroid is found by finding the normal vector of the plane of the top triangle and placing the bottom centroid at a distance of the TriTruss height along the normal vector from the top centroid.

$$C_{Bottom} = C_{Top} - H \frac{N_{Top}}{\|N_{Top}\|} \tag{17}$$

To find the intersection of the bottom triangle plane and the normal line from a mirror surface node, a vector from the centroid to the intersection point will be perpendicular to the normal vector of the bottom triangle plane. The dot product of two perpendicular vectors equals zero.

$$N_{Bottom} \cdot (C_{Bottom} - P_{BottomScalene_i}) = 0 \tag{18}$$

Substituting Equation (16) into Equation (18), $$N_{Bottom} \cdot \left( C_{Bottom} - P_{Mirror_i} + L_i \frac{N_{Mirror_i}}{\|N_{Mirror_i}\|} \right) = 0 \tag{19}$$

Distributing, $$N_{Bottom} \cdot C_{Bottom} - N_{Bottom} \cdot P_{Mirror_i} + L_i \left( N_{Bottom} \cdot \frac{N_{Mirror_i}}{\|N_{Mirror_i}\|} \right) = 0 \tag{20}$$

And solving for $L_i$ (the length the normal vector has to be from the mirror surface node in order to intersect the bottom triangle plane), $$L_i = \frac{(N_{Bottom} \cdot P_{Mirror} - N_{Bottom} \cdot C_{Bottom})}{\left( N_{Bottom} \cdot \frac{N_{Mirror_i}}{\|N_{Mirror_i}\|} \right)} \tag{21}$$

Substituting Equation (21) into Equation (16), $$P_{BottomScalene_i} = P_{Mirror_i} - \frac{(N_{Bottom} \cdot P_{Mirror_i} - N_{Bottom} \cdot C_{Bottom})}{\left( N_{Bottom} \cdot \frac{N_{Mirror_i}}{\|N_{Mirror_i}\|} \right)} \frac{N_{Mirror_i}}{\|N_{Mirror_i}\|} \tag{22}$$

After the bottom scalene points are found, the largest possible equilateral triangle is fit inside the scalene triangles without overlapping any adjacent triangles. These equilateral triangles are then oriented to match the top equilateral triangles. The new bottom equilateral vertices are translated a distance equal to the minimum radius from the centroid along the line between the centroid and straight-sided vertices.

$$P_{BottomEquilateral_i} = C_{Bottom} + r_{Bottom} \frac{M_{BottomEquilateral_i}}{\|M_{BottomEquilateral_i}\|} \tag{23}$$

where $$M_{BottomEquilateral_i} = (C_{Bottom} - P_{BottomStraight_i}) \tag{24}$$

After the bottom vertices of the wedge-shaped TriTruss were found, the maximum gap size in the bottom surface was calculated to be 20.4 mm (0.802 in.). The bottom strut length was aBottom=3.335 m.

For one non-limiting TriTruss implementation, the core of the truss support component is the final section to be calculated, which is referred to as the middle triangle section in FIG. 5B. However, in alternative non-limiting embodiments, the middle triangle section can be omitted.

Referring back to FIG. 5B, the locations of the middle triangles are not significant in relation to the overall truss, but the lengths of the different struts are significant to manufacturing each TriTruss support module 510 correctly. Because the module is wedge-shaped, the middle triangle will not be located exactly at the mid-plane, and the top and bottom diagonal struts will have different lengths. The mid-nodal points are at the intersection of each set of crossing diagonal vectors.

$$P_{TopEquilateral_1} - d_{Top} \frac{P_{TopEquilateral_1} - P_{BottomEquilateral_2}}{\|P_{TopEquilateral_1} - P_{BottomEquilateral_2}\|} = \quad (25)$$

$$P_{TopEquilateral_2} - d_{Top} \frac{P_{TopEquilateral_2} - P_{BottomEquilateral_1}}{\|P_{TopEquilateral_2} - P_{BottomEquilateral_1}\|}$$

Solving algebraically for the length of the top diagonal, $$d_{Top} = \frac{P_{TopEquilateral_2} - P_{TopEquilateral_1}}{\left( \frac{P_{TopEquilateral_2} - P_{BottomEquilateral_1}}{\|P_{TopEquilateral_2} - P_{BottomEquilateral_1}\|} - \frac{P_{TopEquilateral_1} - P_{BottomEquilateral_2}}{\|P_{TopEquilateral_1} - P_{BottomEquilateral_2}\|} \right)} \quad (26)$$

The length of the top diagonals was calculated to be 2.253 m. The location of each mid-node can then be found by translating a distance equal to the length of the top diagonal strut along the diagonal line from the top vertex.

$$P_{Middle_{12}} = P_{TopEquilateral_1} - d_{Top} \frac{P_{TopEquilateral_1} - P_{BottomEquilateral_2}}{\|P_{TopEquilateral_1} - P_{BottomEquilateral_2}\|} \quad (27)$$

The length of the bottom diagonal can then be calculated by taking the norm of the bottom diagonal vector.

$$d_{Bottom} = \|P_{Middle_{12}} - P_{BottomEquilateral_2}\| \quad (28)$$

The length of the bottom diagonals was calculated to be 2.337 m. The length of the middle triangle struts, b, can be calculated by taking the norm of a mid-node to mid-node vector.

$$b = \|P_{Middle_{12}} - P_{Middle_{23}}\| \quad (29)$$

The length of the middle triangle struts was calculated to be 1.637 m.

For evaluation purposes, finite element (FE) models of the triangle truss support structure with and without nodal gaps were developed based on the geometry information and material properties listed in Table 2 below. For the model without nodal gaps, every strut length on one side of the axis of symmetry is unique, and the vertices of connecting TriTruss support modules 510 meet at the nodal points. For the model with nodal gaps, the vertices of adjacent TriTruss support modules 510 were connected together by beam elements to represent multi-nut joints or connectors in the nodal gaps 120. The nodal gap joint regions 120 are shown as dots or filled-in circles in a top surface view of the truss support structure or system 1600 in FIG. 16. For the FE models, the in-plane cross-sections of surface and core members were assumed to be tubes with the same diameter.

TABLE 2

| | | | |
|---|---|---|---|
| Module Height (m) | 1.81 | Mirror Mass (kg) | 35520 |
| Surface Member Length (m) | 3.13 | TriTruss Mass (kg) | 1100 |
| Strut Thickness (m) | 0.00254 | Density (kg/m$^3$) | 1626 |
| Strut Radius (m) | 0.02673 | Modulus of Core Members (Pa) | 2.8E+11 |
| Poisson Ratio, all Members | 0.3 | Modulus of Surface Members (Pa) | 2.8E+11 |

Figure 17A:
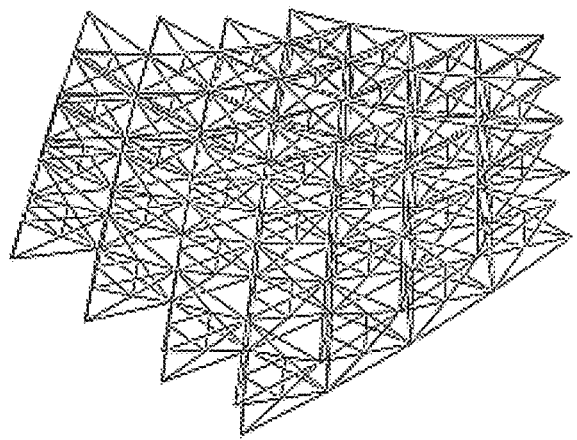
FIGS. 17A-17C shows frequency responses of a finite element model of a triangle truss lattice structure without nodal gaps over the first three frequency modes respectively.
Figure 17B:
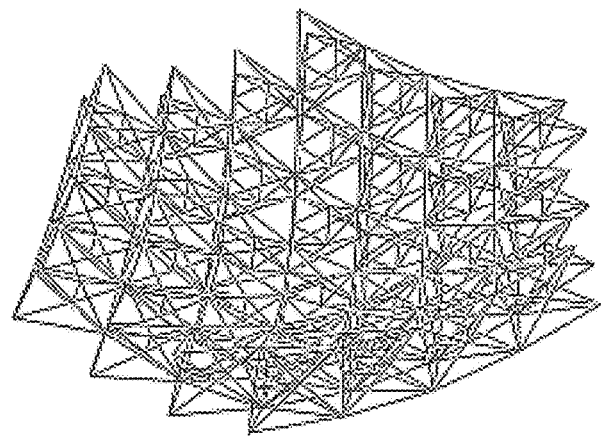
Figure 17C:
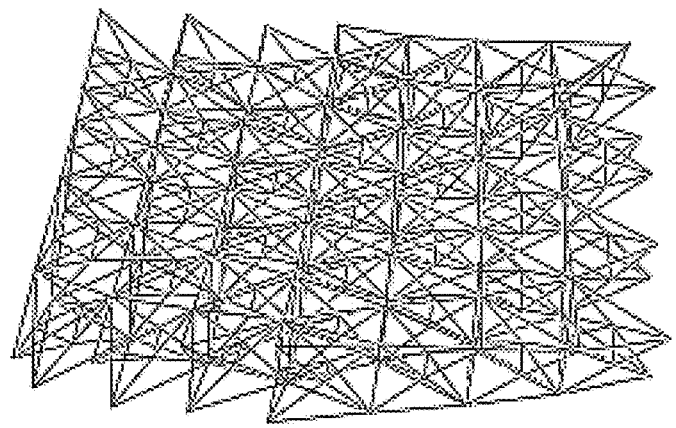
Figure 18A:
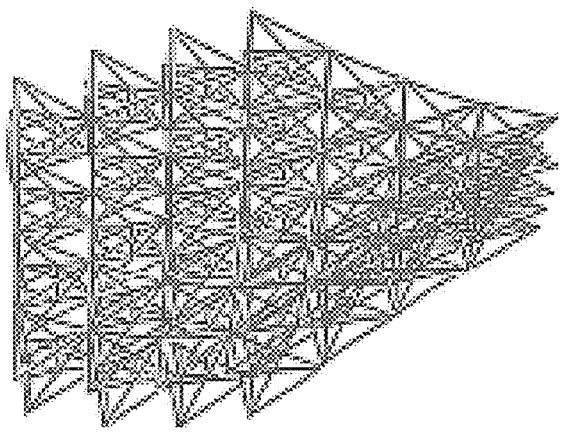
FIGS. 18A-18C shows frequency responses of a finite element model of a triangle truss lattice structure with nodal gaps over the first three frequency modes respectively.
Figure 18B:
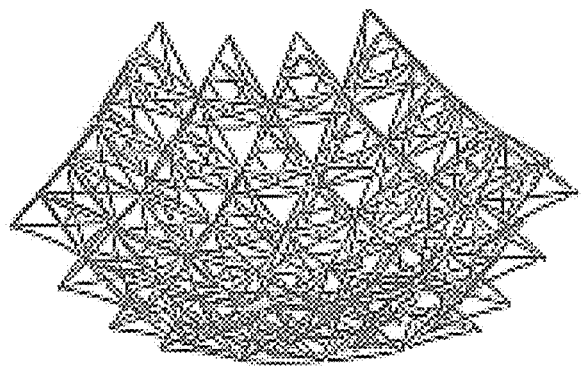
Figure 18C:
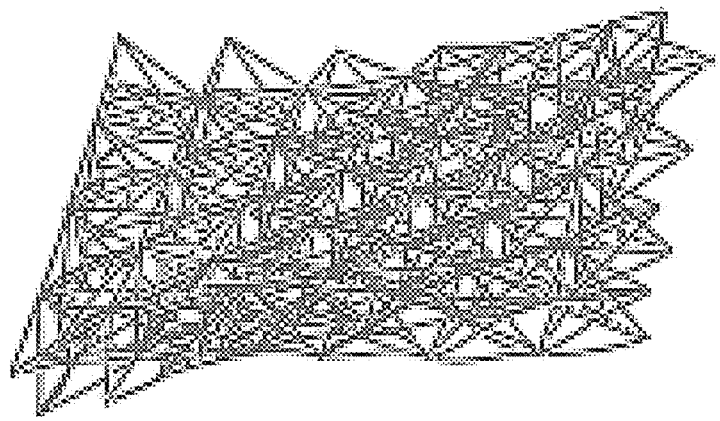

Typically, a fundamental frequency (associated with a required stiffness) requirement is used to evaluate the truss design parameters and to review structural responses for space structures. Frequency analyses with a free-free boundary conditions were performed on FE models to study the effects of the gaps and multi-nuts on the structural response of the truss structure. Frequency responses for the first three modes for both FE models are shown in FIGS. 17A-17C (without nodal gaps) and 18A-18C (with nodal gaps).

As indicated in FIGS. 17A-17C and 18A-18C, the first three mode shapes for both models are consistent: taco, bowl, and combined taco and bowl. In addition, the model with nodal gaps shows a five percent reduction in frequency for the first three modes in comparison to the model without nodal gaps. Based on the results of the frequency analysis, it is suggested that the gaps and multi-nuts do not significantly affect the structural response of the truss structure when the multi-nuts have the same bending stiffness as the truss struts.

Figure 19A:
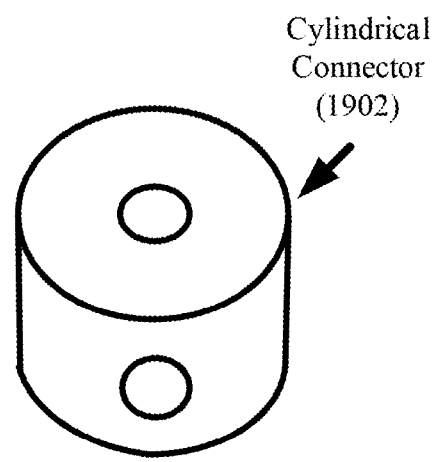
FIG. 19A shows an exemplary cylindrical connector in accordance with the present disclosure.
Figure 19B:
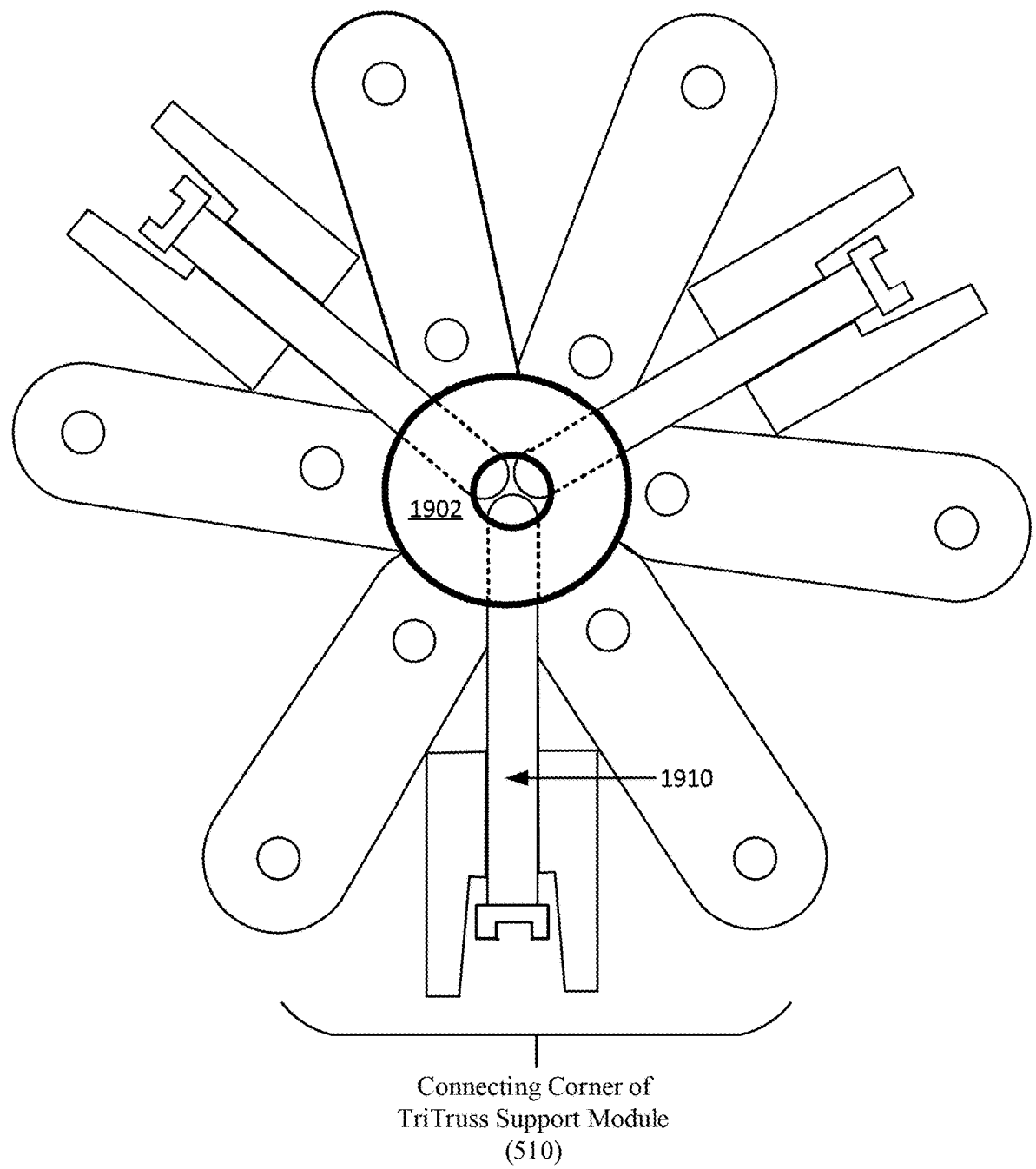
FIG. 19B depicts the connection of corners of truss support modules using an exemplary cylindrical connector in accordance with the present disclosure.
Figure 19C:
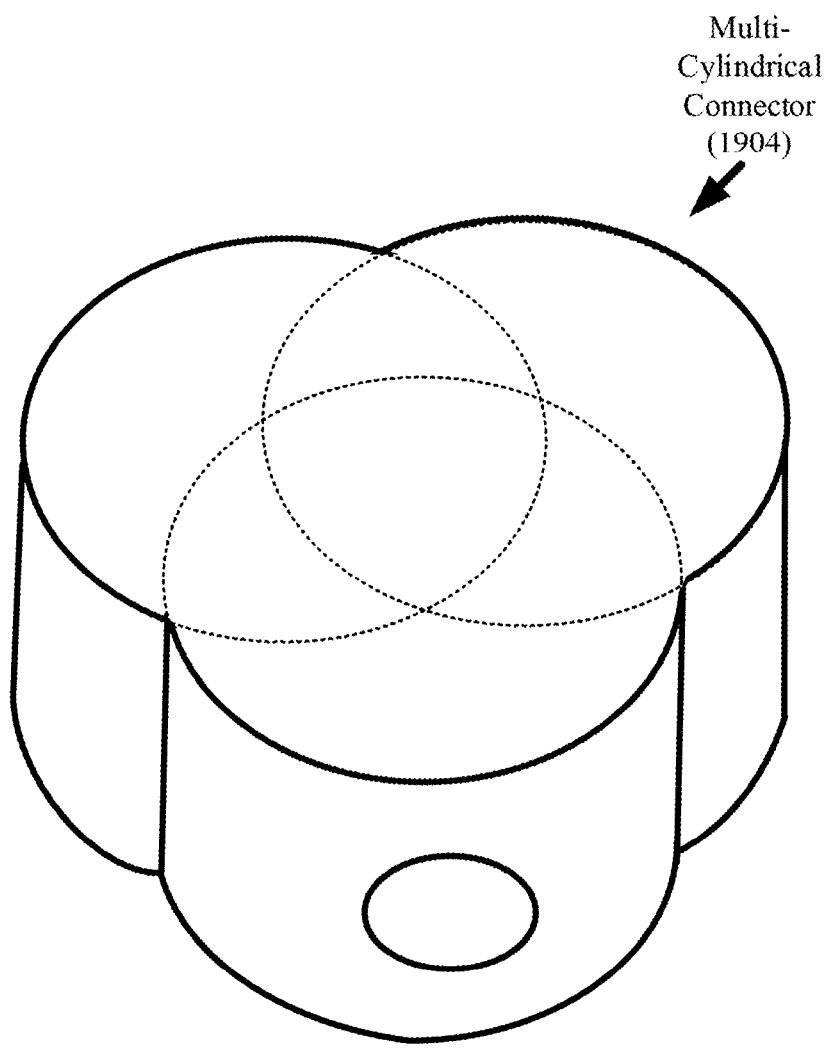
FIG. 19C shows an exemplary multi-cylindrical connector in accordance with the present disclosure.

For assembly of a flat truss support system to form a conjoined structure, a cylindrical connector, such as cylindrical connector 1902 called a multi-nut, as represented in FIG. 19A and FIG. 19B, can be used to join or connect corners of truss support modules, such as an equilateral triangle shaped TriTruss support module 510. In this illustrated example, all truss support modules and all connectors (i.e. the multi-nuts) are identical. One way to achieve the connection is by fastening capture bolts (e.g., bolts 1910 shown in FIG. 19B) from the module corners into tapped holes in the multi-nuts 1902 (also shown in FIG. 19B). On a doubly curved assembled truss constructed with identical TriTruss support modules, each multi-nut connector can be uniquely expanded to fill in the nodal gaps between modules. Although the shape of most multi-nuts will vary, all of the unique multi-cylindrical connectors 1904 can be created by overlapping three cylinders, as represented in FIG. 19C. The size of the gaps 120 between modules 110, 510 directly affects the structural performance of the truss because the truss strut load paths no longer meet at the center of the nodes. The larger the gaps, the farther the load paths deviate from the ideal center of the nodes. Using the minimization techniques previously described, the multi-nut size can be made relatively small in comparison to the size of the TriTruss support modules 510. As a non-limiting example, for a truss support module with a top surface member length of 3.215 meters, a height to surface member length ratio of one, and wedge-shaped modules, the largest multi-nut was calculated to be 40.4 mm (1.6 in.) wide or, 1.24% of the top surface member length. For fabrication purposes, the coordinates of the vertices of three connecting modules can be used to auto-generate multi-nut CAD parts using a procedure template. Minor adjustments may be required depending on the asymmetry of the multi-nut.

In general, the connectors 1902, 1904 can be used to optimize the system for multiple surfaces, simply by changing the connectors. For example, it is possible to move from one curvature to another simply by changing the connectors.

Figure 16:
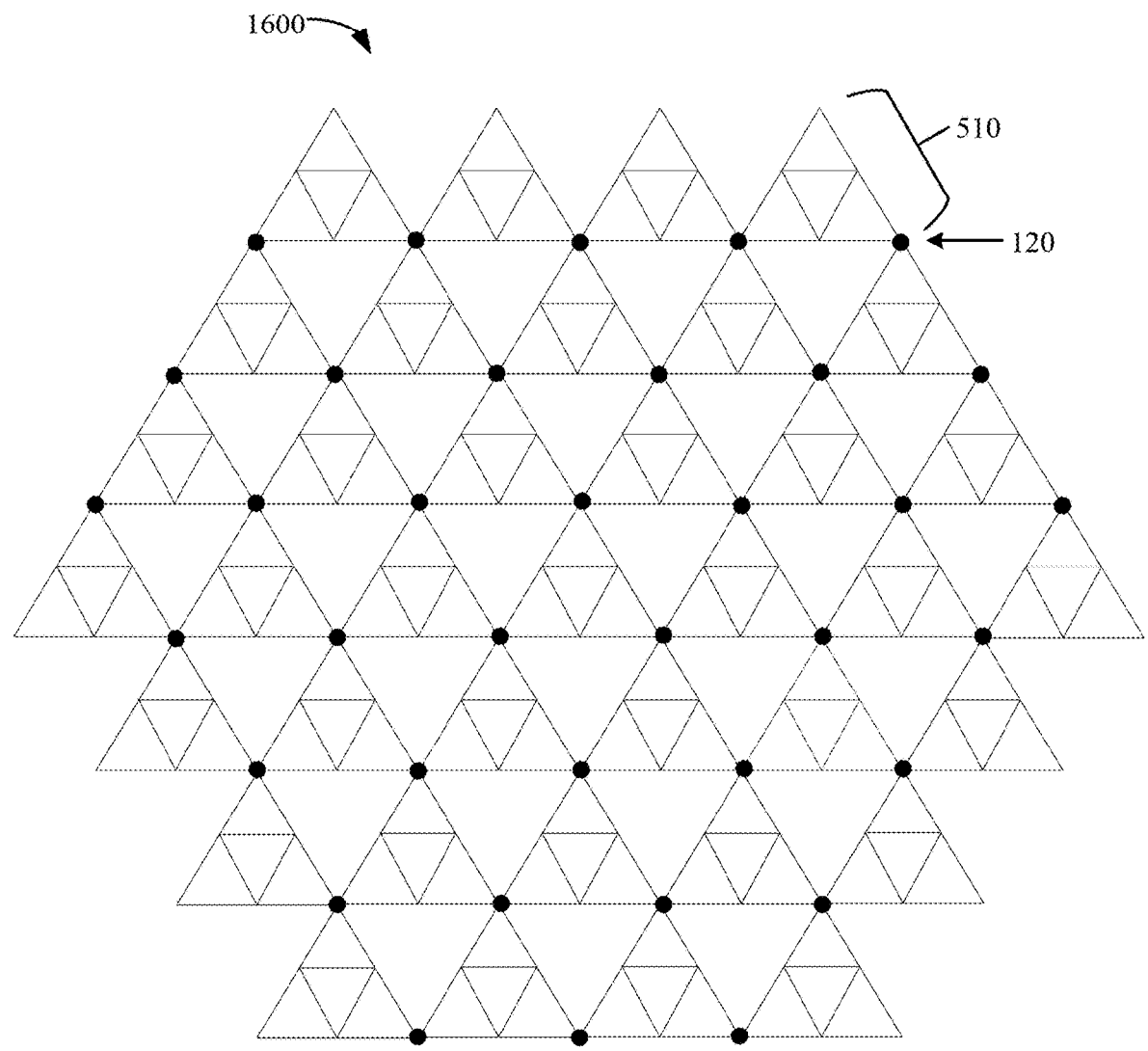
FIG. 16 shows a model of a triangle truss lattice structure having gap joint regions shown as dots in accordance with the present disclosure.
Figure 20:
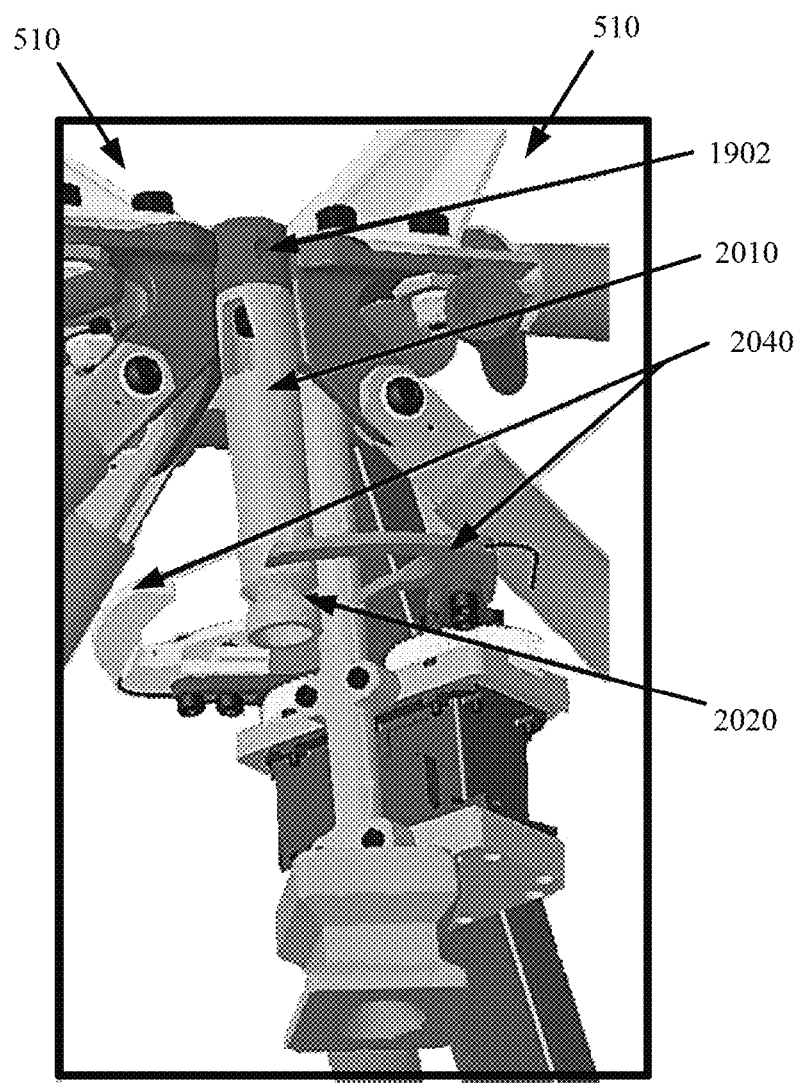
FIG. 20 illustrates assembly of a truss support structure for a curved surface structure in accordance with embodiments of the present disclosure.
Figure 21:
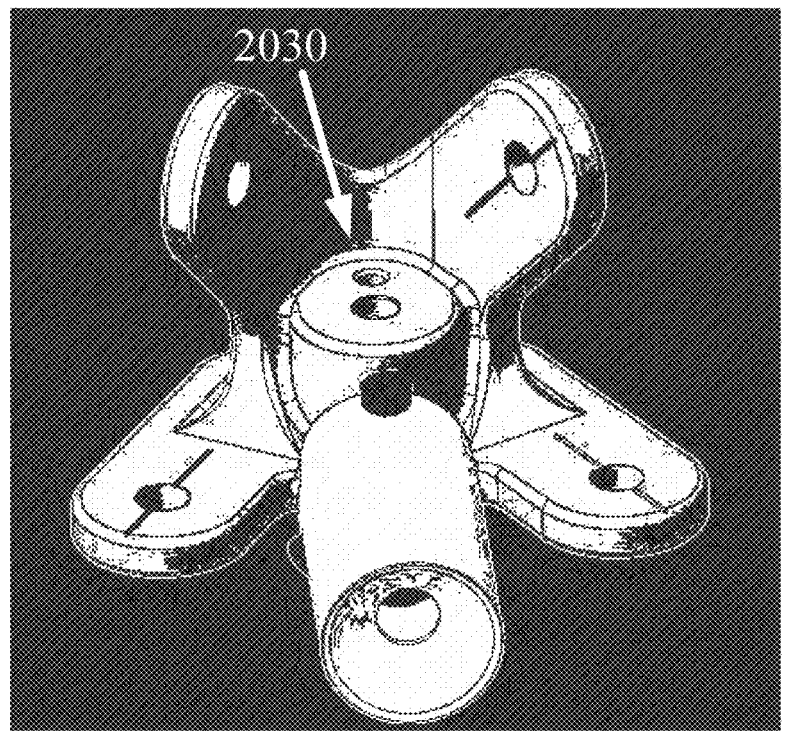
FIG. 21 shows a mounting platform that can be integrated in a corner of a truss support module in accordance with embodiments of the present disclosure.
Figure 22:
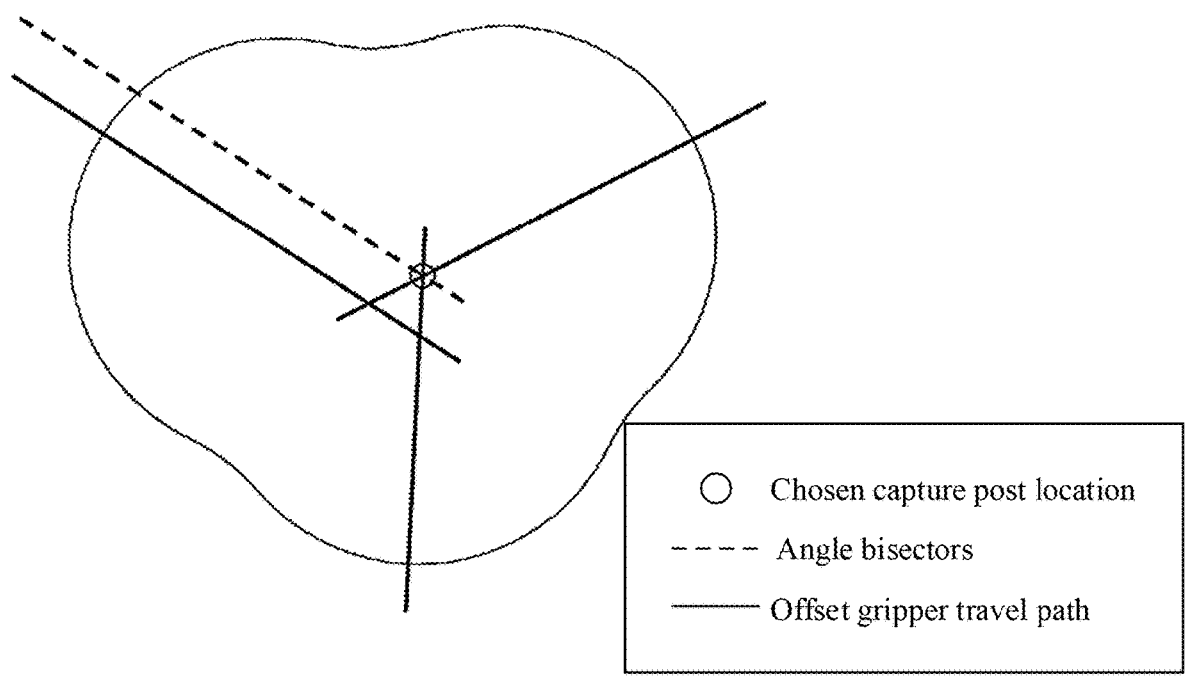
FIG. 22 illustrates a possible travel path of a capture gripper tool to position a corner of a truss support module during assembly of a truss support structure in accordance with embodiments of the present disclosure.

The assembly of a truss support structure, such as structure 1600 shown in FIG. 16, for a curved surface structure, as a mirror reflector, may be performed robotically in certain implementations. In one such implementation, a plurality of multi-nut connectors 1902 will have a vertical post, which may be referred to as a capture post (such as capture posts 2010) which may include a tapered guide feature 2020, as shown in FIG. 20, where module corners will have a mounting platform 2030, as represented in FIG. 21, for a capture gripper tool 2040 to be attached and detached. The robot can attach the capture gripper tool 2040 to the mounting platform 2030 and move the module 510 close to its matching multi-nut 1902. Further, the capture gripper tool 2040 may close about the guide feature 2020 on the capture post 2010, pulling the module 510 into position, and lock the connection by driving the capture bolt 1910 into the multi-nut connector 1902 (FIG. 19B). In this implementation, each capture bolt 1910 lies along the angle bisector of its corner. The grippers of the gripper tool 2040 are configured to pull the corners of the modules 510 to the axis of the angle bisector so that the capture bolt 1910 aligns with its hole in the multi-nut connector 1902. Due to the asymmetry of the multi-nuts 1902, the angle bisectors of three connecting corners may not intersect in the center of the multi-nut 1902. Therefore, each mounting platform 2030 may be uniquely angled or offset to allow the grippers of the capture gripper tool 2040 to capture the guide feature 2020 on the capture post 2010 and pull the module corner along the correct axis, as demonstrated by FIG. 22. Alternative options can be used instead of unique mounting platforms 2030. For example, among others, an adapter can be applied to each mounting platform, the gripper system may have another actuator to adjust the gripper's angle, or more degrees of freedom may be added to the fingers of the capture gripper tool 2040 to allow them to independently adjust to the correct angle. In one non-limiting embodiment, grooves on the capture post 2010 are configured to include the required or correct angle, such that the contact between the gripping fingers and the groove orients the support module 510 correctly. This allows the gripping tool 2040 to be mounted and positioned the same way on every truss support module (e.g., TriTruss support module).

In various implementations, the geometry of the TriTruss support module 510 and multi-nut connectors 1902, 1904 has been designed to enable the module 510 to be brought into place for assembly using an approach either perpendicular to a local tangent to the parabolic surface or parallel to a local tangent to the surface of the parabolic surface. The module corner faces may be tapered to allow the module 510 to vertically slide by the multi-nuts 1902, 1904 that are already fixed to the truss. This may also be useful in that it allows any individual module 510 to be removed for repairs or replacement after the truss support structure 1600 is fully assembled. The multi-nuts 1902, 1904 can be pre-attached to the corners of modules 510 prior to packaging in the launch vehicle, thereby reducing the number of assembly steps in space. The choice of which multi-nut connectors 1902, 1904 to pre-attach and at what locations can be done strategically to further simplify the assembly process.

In brief, the systems and methods of the present disclosure represents a major breakthrough in construction of curved structures due to versatility to a variety of global shapes, commonality of major components, ease of assembly, and efficiency of resulting global response. While the work of the present disclosure is applicable to space assembly of modular units, the work is also directly applicable to general terrestrial assembly of systems with curvature, such as sports stadiums, airports, aquariums, convention centers, bridges, tunnels, terrestrial telescopes, radars, domes, hangers, etc. because it provides an efficient, lightweight approach to constructing large systems from uniform modules.

FIG. 23 provides a flowchart that may be implemented as part of arranging and assembling a truss support structure for supporting a curved surface structure. A planar lattice pattern, such as pattern 420 of FIG. 4, for a truss support structure may be provided (see, e.g., block 2310), wherein the truss support structure provides identical truss support modules 110 and the planar lattice pattern may be composed of identical regular polygon shapes with a distance between connecting nodes of a respective polygon shape being a uniform set distance value. The planar lattice pattern may be mapped (e.g., see block 2320) onto a doubly curved surface by optimizing positioning of connecting nodes of each polygon shape of the planar lattice pattern to the uniform set distance value, wherein each newly positioned node is optimally placed in relation to its already placed neighboring nodes with respect to the uniform set distance value. After all nodes of the planar lattice pattern 420 have been placed on the doubly curved surface, each node may be adjusted (such as via block 2330) one-by-one based on optimizing its positioning relative to its neighboring nodes with respect to the set value. Next, a curved lattice pattern 800 may be determined (such as at block 2340) for the truss support structure (which will support the doubly curved surface) by factoring in an offset distance that exists between a segment of the curved surface support structure when supported by the truss support module 110, in which the curved lattice pattern comprises identical uniform regular polygon shapes and provides nonuniform gaps 120 between connecting polygon shapes, wherein a respective regular polygon shape represents a top surface of the truss support module 110. As such, the truss support structure 1600 can be assembled (such as at block 2350) to support the doubly curved surface structure based on the curved lattice pattern 800 with connectors 1902, 1904 joining connecting truss support modules 110 that are sized to fill respective nonuniform gaps 120 of the curved lattice pattern 800.

Figure 24:
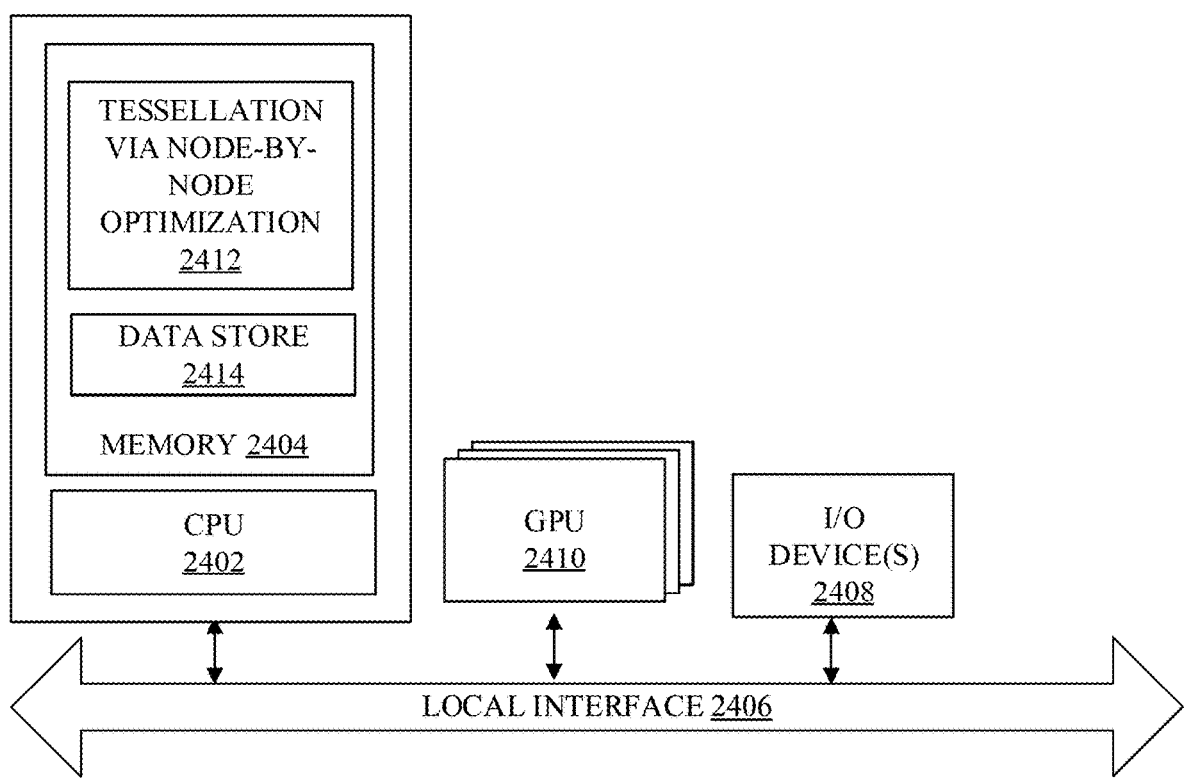
FIG. 24 depicts a schematic block diagram of a computing device that can be used to implement various embodiments of the present disclosure.

FIG. 24 depicts a schematic block diagram for a computing device 2400 that can be used to implement various embodiments of the present disclosure. An exemplary computing device 2400 includes at least one processor circuit, for example, having a processor (CPU) 2402 and a memory 2404, both of which are coupled to a local interface 2406, and one or more input and output (I/O) devices 2408. The local interface 2406 may comprise, for example, a data bus with an accompanying address/control bus or other bus structure as can be appreciated. The computing device 2400 may further include Graphical Processing Unit(s) (GPU) 2410 that are coupled to the local interface 2406 and may utilize memory 2404 and/or may have its own dedicated memory. The CPU and/or GPU(s) can perform various operations such as image enhancement, graphics rendering, image/video processing, and any of the various operations described herein.

Stored in the memory 2404 are both data and several components that are executable by the processor 2402. In particular, stored in the memory 2404 and executable by the processor 2402 is a tessellation via node-by-node optimization code 2412 in accordance with embodiments of the present disclosure, such as, but not limited to, FIG. 2, among other related processes. Also stored in the memory 2404 may be a data store 2414 and other data. In addition, an operating system may be stored in the memory 2404 and executable by the processor 2402. The I/O devices 2408 may include input devices, for example but not limited to, a keyboard, mouse, etc. Furthermore, the I/O devices 2408 may also include output devices, for example but not limited to, a printer, display, etc.

Certain embodiments of the present disclosure can be implemented in hardware, software, firmware, or a combination thereof. If implemented in software, the tessellation via node-by-node optimization logic or functionality in accordance with embodiments of the present disclosure is implemented in software or firmware that is stored in a memory and that is executed by a suitable instruction execution system. If implemented in hardware, the logic or functionality can be implemented with any or a combination of the following technologies, which are all well known in the art: discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer-implemented method comprising:
    providing an initial planar lattice pattern having identical regular polygon shapes which represent truss support modules for supporting a curved surface structure, wherein the truss support module can be deployed or crated by a lattice structure having nodal points between strut members of the lattice structure, wherein a length of each side of the polygon shape is an identical set value;
    determining respective positions of the nodal points of the identical polygon shapes on a top surface of the curved surface structure by placing a starting nodal point on an axis of symmetry of the initial planar lattice pattern and iteratively positioning each nodal point in relation to already placed neighboring nodes to make a distance between a currently positioned nodal point optimally close with the identical set value of the initial planar lattice pattern;
    forming a curved lattice pattern of the truss support module composed of identical regular polygon shapes based on the positions of the nodal points of the identical polygon shapes; and
    assembling the truss support structure to support the curved surface structure using cylindrical connectors corresponding to respective gaps that are non-uniform in size and are positioned between connecting corners of the truss support modules.

2. The computer-implemented method of claim 1, wherein forming the curved lattice pattern of the truss support module comprises:
    calculating nodal positions of a top surface of the truss support modules based on the positions of the nodal points of the identical polygon shapes of the curved surface structure and an offset distance between the top surface of the curved surface structure and a top surface of the truss support structure comprising the truss support structure modules; and
    calculating positioning of a bottom surface of the truss support modules based on the nodal positions of the top surface of the truss support structure and a distance between the top surface and the bottom surface of the truss support modules.

3. The computer-implemented method of claim 2, wherein the bottom surface of the truss support module is identical in size and shape to the top surface of the truss support module and is parallel to the top surface of the truss support module.

4. The computer-implemented method of claim 2, wherein the bottom surface of the truss support module is larger or smaller in size and identical in shape to the top surface of the truss support module and is parallel to the top surface of the truss support module.

5. The computer-implemented method of claim 4, further comprising calculating positioning of a middle surface layer of the truss support module based on the positioning of the top surface and the bottom surface of the truss support modules.

6. The computer-implemented method of claim 1, wherein the identical regular polygon shapes comprise equilateral triangles.

7. The computer-implemented method of claim 1, wherein different sized cylindrical connectors are utilized to assemble the truss support structure.

8. The computer-implemented method of claim 1, wherein the curved surface structure is a doubly curved surface structure and the cylindrical connectors are multi-cylindrical connectors.

9. The computer-implemented method of claim 8, wherein different sized multi-cylindrical connectors are utilized to assemble the truss support structure.

10. The computer-implemented method of claim 1, wherein the curved surface structure is a doubly curved surface structure.

11. The computer-implemented method of claim 1, wherein the identical regular polygon shapes comprise equilateral triangles, wherein the top surface of the truss support modules is representative of a scalene triangle shape due to an offset distance between the top of the curved surface structure and the top surface of the truss support structure, the method further comprising:
    forming a first lattice pattern of the truss support modules using the scalene triangle shape to represent the top surface of a respective truss support module; and
    overlaying a new equilateral triangle shape on each of the scalene triangle shapes of the first lattice pattern and optimally orienting the new equilateral triangle shape to the scalene triangle shape on the first lattice pattern to form a final lattice pattern of the truss support modules that is composed of identical new equilateral triangles having gaps between connecting nodes of the new equilateral triangles.

12. A method comprising:
    providing a planar lattice pattern for a truss support structure, wherein the truss support structure is composed of identical truss support modules, wherein the planar lattice pattern is composed of identical regular polygon shapes with a distance between connecting nodes of a respective polygon shape being a uniform set distance value;
    mapping the planar lattice pattern on a doubly curved surface by optimizing positioning of connecting nodes of each polygon shape of the planar lattice support structure to the uniform set distance value, wherein the doubly curved surface represents a curved surface structure to be supported by the truss support structure, wherein each newly positioned node is optimally placed in relation to its already placed neighboring nodes with respect to the uniform set distance value;
    after all nodes of the planar lattice pattern have been placed on the doubly curved surface, iteratively adjusting each node one-by-one based on optimizing its positioning relative to its neighboring nodes with respect to the set value;
    determining a curved lattice pattern for the truss support structure to support the doubly curved surface by factoring in an offset distance that exists between a segment of the curved surface support structure when supported by the truss support module, wherein the curved lattice pattern is composed of identical uniform regular polygon shapes and provides nonuniform gaps between connecting polygon shapes, wherein a respective regular polygon shape represents a top surface of the truss support module; and assembling the truss support structure to support the doubly curved surface using cylindrical connectors corresponding to respective gaps positioned between connecting corners of the truss support modules.

13. The method of claim 12, wherein the assembling the truss support structure is based on the curved lattice pattern with the cylindrical connectors joining connecting truss support modules that are sized to fill respective nonuniform gaps of the curved lattice pattern.

14. A truss support structure to support a curved surface using cylindrical connectors corresponding to respective gaps positioned between connecting corners of truss support modules, the truss support structure assembled based on a curved lattice pattern formed by a system comprising:

a computing device having a processor and a memory; and machine-readable instructions stored in the memory that, when executed by the processor, cause the computing device to perform operations comprising:

receive an initial planar lattice pattern having identical regular polygon shapes which represent truss support modules for supporting the curved surface structure, wherein the truss support module can be deployed or crated by a lattice structure having nodal points between strut members of the lattice structure;

determining respective positions of the nodal points of the identical polygon shapes on a top surface of the curved surface structure by placing a starting nodal point on an axis of symmetry of the initial planar lattice pattern and iteratively positioning each nodal point in relation to already placed neighboring nodes to make a distance between a currently positioned nodal point optimally close with the identical set value of the initial planar lattice pattern; and forming the curved lattice pattern of the truss support module that is composed of identical regular polygon shapes by:

calculating nodal positions of a top surface of the truss support modules based on the positions of the nodal points of the identical polygon shapes of the curved surface structure and an offset distance between the top surface of the curved surface structure and a top surface of the truss support structure comprising the truss support structure modules, wherein each respective gap is positioned between connecting corners of the truss support structure modules; and calculating positioning of a bottom surface of the truss support modules based on the nodal positions of the top surface of the truss support structure and a distance between the top surface and the bottom surface of the truss support modules.

15. The truss support structure of claim 14, wherein the identical regular polygon shapes comprise equilateral triangles.

16. The truss support structure of claim 14, wherein the bottom surface of a truss support module is identical in size and shape to the top surface of a truss support module and is parallel to the top surface of the truss support module.

17. The truss support structure of claim 14, wherein the bottom surface of a truss support module is larger or smaller in size to the top surface of the truss support module and is parallel to the top surface of the truss support module.

18. The truss support structure of claim 14, wherein respective gaps positioned between connecting corners of the truss support modules are non-uniform in size.

* * * * *